US008670847B2

(12) United States Patent
Sloan et al.

(10) Patent No.: US 8,670,847 B2
(45) Date of Patent: Mar. 11, 2014

(54) METHOD AND DEVICE FOR FANTASY SPORTS PLAYER RECOMMENDATIONS USING A WEIGHTED PLAYER RANKING SYSTEM

(75) Inventors: James N. Sloan, Bellevue, WA (US); David M. Fishel, Farmington, CT (US); Michael A. Polikoff, Bristol, CT (US); Jonathan G. Kinnersley, Seattle, WA (US); James R. Kelley, Seattle, WA (US); Pierre Y. Becquey, Southington, CT (US); Nathan M. Ravitz, Bristol, CT (US)

(73) Assignee: Disney Enterprises, Inc., Burbank, CA (US)

( * ) Notice: Subject to any disclaimer, the term of this patent is extended or adjusted under 35 U.S.C. 154(b) by 49 days.

(21) Appl. No.: 13/331,894

(22) Filed: Dec. 20, 2011

(65) Prior Publication Data
US 2012/0330444 A1    Dec. 27, 2012

Related U.S. Application Data

(60) Provisional application No. 61/500,018, filed on Jun. 22, 2011.

(51) Int. Cl.
*G07F 17/32*    (2006.01)
*A63F 13/10*    (2006.01)

(52) U.S. Cl.
USPC .............................................. 700/91; 463/42

(58) Field of Classification Search
USPC ........................................ 463/4, 7, 42; 700/91
See application file for complete search history.

(56) References Cited

U.S. PATENT DOCUMENTS

| | | | |
|---|---|---|---|
| 8,509,929 B1 * | 8/2013 | Hughes et al. | 700/91 |
| 2006/0183548 A1 * | 8/2006 | Morris et al. | 463/42 |
| 2006/0252476 A1 * | 11/2006 | Bahou | 463/4 |
| 2008/0125228 A1 * | 5/2008 | Ware et al. | 463/42 |
| 2010/0075729 A1 * | 3/2010 | Allen et al. | 463/7 |
| 2012/0149472 A1 * | 6/2012 | Miller | 463/42 |

* cited by examiner

*Primary Examiner* — Dmitry Suhol
*Assistant Examiner* — Jason Yen
(74) *Attorney, Agent, or Firm* — Fay Kaplun & Marcin, LLP

(57) ABSTRACT

A method and device are for fantasy sport applications including receiving a plurality of ranking values associated with a sport player; assigning a corresponding weight value to each ranking value; determining a score value as a function of the ranking value and the corresponding weight value; determining a final ranking value as a function of the score values for the sport player; and generating a recommendation for the sport player as a function of the final ranking value.

23 Claims, 19 Drawing Sheets

METHOD AND DEVICE FOR FANTASY SPORTS PLAYER RECOMMENDATIONS USING A WEIGHTED PLAYER RANKING SYSTEM

PRIORITY CLAIM

This invention claims priority to U.S. Provisional Application Ser. No. 61/500,018 entitled "Automated Fantasy Draft Player Recommendations", filed Jun. 22, 2011, the disclosure of which is incorporated, in its entirety, herein.

INCORPORATION BY REFERENCE

The entire disclosures of U.S. patent application Ser. No. 12/760,277, filed Apr. 14, 2010, U.S. patent application Ser. No. 12/760,422, filed Apr. 14, 2010, U.S. patent application Ser. No. 12/760,384, filed Apr. 14, 2010, and U.S. patent application Ser. No. 12/760,269, filed Apr. 14, 2010, including the specification, claims, and abstract, all of which share at least one common inventor and are assigned to a common assignee with the present application, are hereby expressly incorporated by reference herein.

FIELD OF THE INVENTION

This present invention pertains to the field of method and device for fantasy sport applications. The exemplary embodiments relate to a method and system for providing recommendations, in particular for drafting or managing a player in a fantasy sport team

BACKGROUND INFORMATION

A fantasy sport game is a simulation game where users act as managers or owners of simulated sport teams called "fantasy teams," where each team comprises a number of "players." Thus, the term "owner" is used to refer to a participant in the fantasy sport game. An owner may be a natural person or a computer-controlled opponent. A "user" is a fantasy owner who is also a natural person. Thus, the term "user" and "owner" are used interchangeably. In contrast, the term "player" refers to one of the selectable fantasy characters. In certain fantasy sport games, each player corresponds to an athlete in a professional sport league.

Features for conventional fantasy sport games are already known in the art. In a first example, a player evaluation system uses historical data to predict player performance through the end of the season using a blending function. The system is also applied in a draft context by assigning average performance values to the slots on the owner's team that have not yet been filled with players yet to be drafted. In calculating team points, one version weighs certain statistics more heavily than others.

In another conventional feature for a fantasy sport game, a system uses draft position information to make draft recommendations. The draft position information is used to determine a likelihood that a given player, or a class of players, will be available. The draft position information may be used to provide recommendations and information predictive of the available player pool at the time of a given user-participant's draft positions, or at the time of other draft positions. Two common methodologies used for this type of system is Value Based Drafting ("VBD") or Dynamic VBD ("DVBD"). A player valuation module uses dynamic player valuation, including a durability parameter, a consistency parameter, and a strength of an opponents' defenses parameter.

Conventional recommendation engines are also known in the art. An example of such an engine utilizes historical information about competitors' past picks and performance in a fantasy league to determine the methodology the competitor is using to make picks, specifically attempting to match past picks with certain experts to determine which expert's advice the competitor is most likely following. In another conventional recommendation engine, the players on the current roster are compared to the best available players to make a recommendation. In yet another conventional recommendation engine, player analyzing software queries a sport statistics system to analyze the relevant players and delivers the analysis to a roster move recommending software component that delivers to the user roster move recommendations based on the results of the player analysis. The player analysis may be based on actual statistics or projected statistics.

Other recommendation engines relate to other features of a fantasy sport game such as start/sit recommendations, which tend to be based upon a specific expectation of the points scored and is made without reference to the other team in the matchup. That is, they focus on attempting to score the most possible points without any concern about what the other team will do or how likely victory may be.

Fantasy team owners may consult an average draft position chart, which is information that is publicly available, in order to determine whether or not it is safe to wait one more round in order to make their selection or if they would be well-advised to select the player immediately. Most conventional solutions start with a survey of the available players and then a (frequently arbitrary) determination of their differences and similarities. However, this is a fairly manual process; at best, fans can use a "cheat sheet" assembled by a professional research staff (e.g., a news service or content provider) to reduce the burden.

Some fantasy sport owners, who are participating in a conventional auction-style draft, will compute players' auction values before the draft and then approximate the necessary adjustments as the draft goes along.

In addition, successful fantasy owners tend to attempt to ascertain what players others in their draft are likely to target and then adjusting their draft strategy accordingly. For example, a team that is drafting 9th in a 10-team league will typically also have the 12th pick. With his 9th pick, he is likely to select the player he believes will be most likely to be selected by the team with the 10th and 11th picks, hoping that another player that he covets more than his opponent may still be available at #12. This is particularly important later in the draft. For example, if a team in a fantasy American football league has the 79th and 82nd selections and needs a quarterback, but the team with the 80th and 81st selections already has an elite quarterback on its roster, it is likely advantageous to select a different position for pick number 79, knowing that the team with picks 80 and 81 is unlikely to select a second quarterback.

Head-to-head fantasy owners are used to attempting to pick up players who have additional games during a matchup, or, in fantasy baseball, players who are "two-start" pitchers (starting pitchers that will get two starts during a week; most only get one, so a two-start pitcher is very valuable).

Successful fantasy team owners are aware of various concepts and make use of them when drafting their fantasy teams. It is usually easy to determine who the primary backup runner is, and charts that include the teams' bye weeks are readily available online.

One conventional scoring system for fantasy sport is "rotisserie" scoring. In this system, the players' object is to accumulate statistics across a predetermined plurality of sport statistics. During the draft, one goal is to build a team that is expected to meet statistical levels that have generated a victory in the past, in the expectation that aggregate statistical levels during the upcoming season will be approximately equal. Fans who are in a league that carries over from year-to-year will sometimes look at last year's standings to approximate this value, but that is of little use to people who are new to the league or who do not have a representative league available to use for comparison. Thus, there is a need for a recommendation engine to provide weighted recommendations in a fantasy sport game environment.

FIG. 3 shows a method 300 for executing a fantasy sport application to draft players as is known in the art. Specifically, the method 300 relates to the fantasy sport application on the side of the host 110 to perform each round for the users 140 to select players in a sequential manner; in one embodiment, this may be a conventional "serpentine" manner. In this embodiment, a user 140 who selects first in an odd number round subsequently selects last in an even number round. In step 310, the draft is initialized. In step 320, an owner or user (e.g., users 140) selects a player and the host 110 executing the fantasy sport application receives the selection, for example, through the network 120 via the transceiver 250. In step 330, a determination is made whether there are further rounds for selections to be made. If the determination in step 330 indicates that more rounds are to be performed, the method 300 returns to step 320 where further selections are received. If the determination in step 330 indicates that no more rounds are to be performed, the method 300 ends.

FIG. 4 shows a method 400 for executing a fantasy sport application to draft players as is known in the art. Specifically, the method 400 relates to the fantasy sport application on the side of the host 110 for the users 140 to select players in a conventional auction format. Thus, a user 140 is provided a predetermined budget in which to "bid" for a player and the player who provides the highest "bid" receives the player for the owner's team. In step 410, the draft is initialized. In step 420, an owner or user 140 selects a player and the host 110 executing the fantasy sport application receives the selection, for example, through the network 120 via the transceiver 250. In step 430, the owner or user 140 provides a bid on the player and the host 110 receives the bid.

In step 430, further owners or users 140 who are also interested in drafting the selected player provide bids and the host 110 receives the respective bids. Thus, in step 440, the host 110 determines the user 140 who provided the highest bid, and that user 140 drafts the player. In step 450, a determination is made whether there are empty slots for a respective position related to the sport in the fantasy sport application. If the determination in step 450 indicates that more auctions are to be performed since there are still empty slots, the method 400 returns to step 420 where further selections are received. If the determination in step 450 indicates that no more slots are empty, the method 400 ends.

SUMMARY OF THE INVENTION

The present invention relates to a method and device for determining recommendations in a fantasy sport application including receiving a plurality of ranking values associated with a sport player; assigning a corresponding weight value to each ranking value; determining a score value as a function of the ranking value and the corresponding weight value; determining a final ranking value as a function of the score values for the sport player; and generating a recommendation for the sport player as a function of the final ranking value.

DETAILED DESCRIPTION

Figure 1:
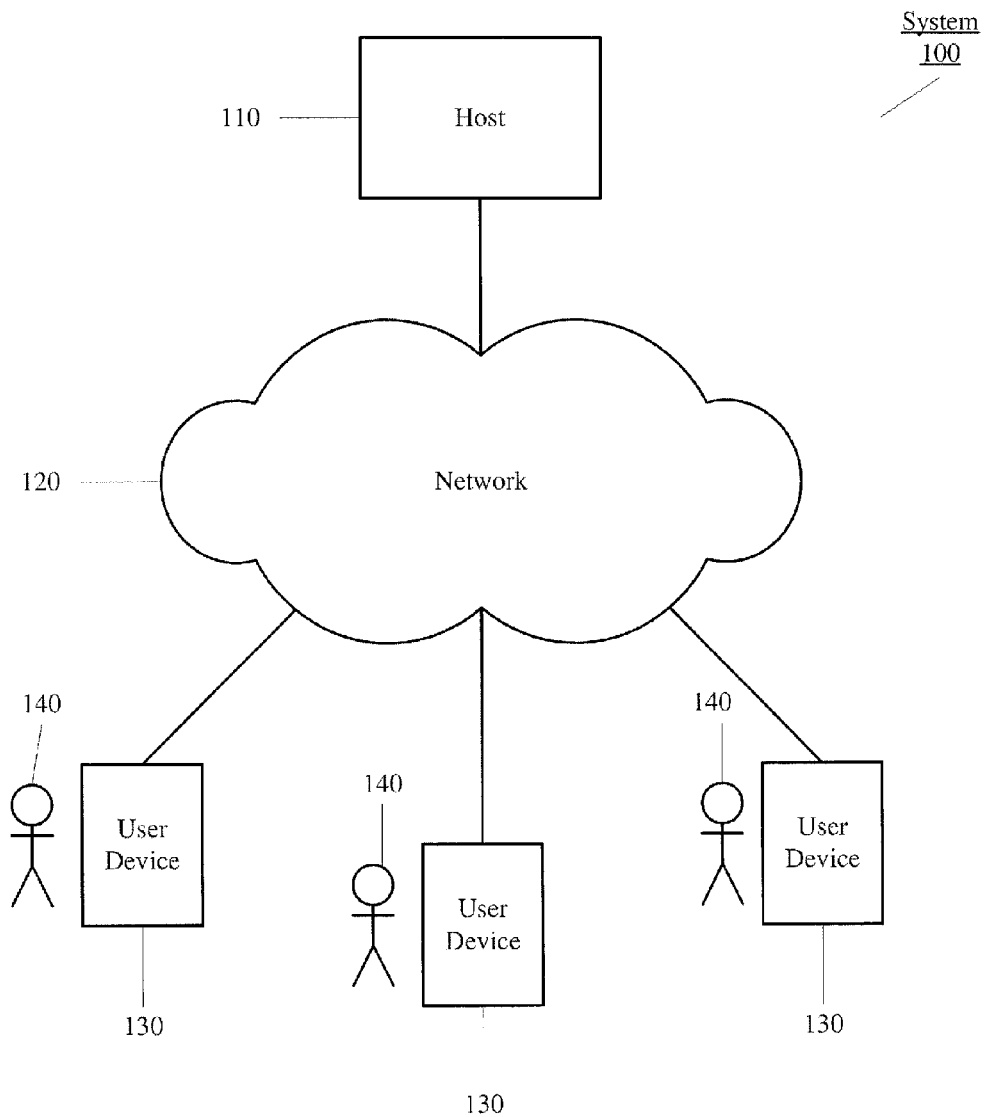
FIG. 1 shows a system in which a fantasy sport application is executed according to an exemplary embodiment of the present invention.

The present invention relates to a method and device for determining recommendations in a fantasy sport application comprising including receiving a plurality of ranking values associated with a sport player; assigning a corresponding weight value to each ranking value; determining a score value as a function of the ranking value and the corresponding weight value; determining a final ranking value as a function of the score values for the sport player; and generating a recommendation for the sport player as a function of the final ranking value.

The exemplary embodiments may be further understood with reference to the following description of the exemplary embodiments and the related appended drawings, wherein like elements are provided with the same reference numerals. The exemplary embodiments are related to systems and methods for providing recommendations for players who are drafted in a fantasy sport application. Specifically, the recommendations are provided as a function of a plurality of rankings that are assigned a weight. While drafting a fantasy sport team, a fantasy team owner must consider a multitude of factors to determine the best possible selection. The exemplary embodiments of the present invention assists in the drafting by providing a set of recommendations that help guide the decision-making process, in a manner useful during a (potentially time-limited) draft.

Initially, it is noted that the terminology used herein for the exemplary embodiments of the present invention are consistent with what was described above. Accordingly, the terms of an "owner" and a "user" may be used interchangeably to refer to a common person who owns a fantasy team. On the other hand, the term of "a player" relates to an actual sport athlete participating in the respective sport of the fantasy sport application.

According to the exemplary embodiments of the present invention, a recommendation engine may provide a single player recommendation or a set of recommended players. As will be described in further detail below, the recommendations may be derived from a variety of sources and tailored for a specific set of rules in use in the league in which a draft is being performed. The rules may be input by the user of the system of the present invention or may be input by a user (i.e., a fantasy team owner) in an exemplary embodiment where the user is participating in a game that is not run by the system owner. In the exemplary embodiments where the rules are integrated into the system that is administering the fantasy league, the recommendations may appear inside the draft client and, therefore, be available to be accessed at any time without having to use an external source.

The fantasy sport application may be an interface provided on a client, for example, executed at a remote location. Accordingly, the client may be executed on an electronic device that is configured with a transceiver to connect the device to a network. FIG. 1 shows a system 100 in which the fantasy sport application may be executed. As shown in FIG. 1, a plurality of users 140 may each have a user device 130 that is configured to communicate with a communication network 120, for example, via a wired or wireless connection. The network 120 may include or connect to a host 110 that is configured to execute the fantasy sport application. As will be described in further detail below, the fantasy sport application may be configured to provide recommendations to the users 140. Accordingly, the host 110 may be connected or have access to a plurality of different sources of data that is used to provide the recommendations. It should be noted that the use of three users 140 and respective user devices 130 is only exemplary. Those skilled in the art will understand that the system 100 may include any number of users 140 and user devices 130 who participate in the fantasy sport application.

The network 120 may be any type of network configuration capable of connecting the plurality of user devices 130. In a first exemplary embodiment of the present invention, the host 110 may be a website. Accordingly, the network 120 may be the Internet (e.g., WAN). In this exemplary embodiment, the network 120 may include a plurality of network components such as a server, a database, a network management arrangement, a plurality of access points, etc. In a second exemplary embodiment of the present invention, the host 110 may be an electronic device (e.g., server terminal) operated by a user. Accordingly, the network 120 may be a local area network (LAN). In this exemplary embodiment, the network 120 may include a hub that is configured to connect the user devices 130 to the host 110 for data to be exchanged thereamong.

Figure 2:
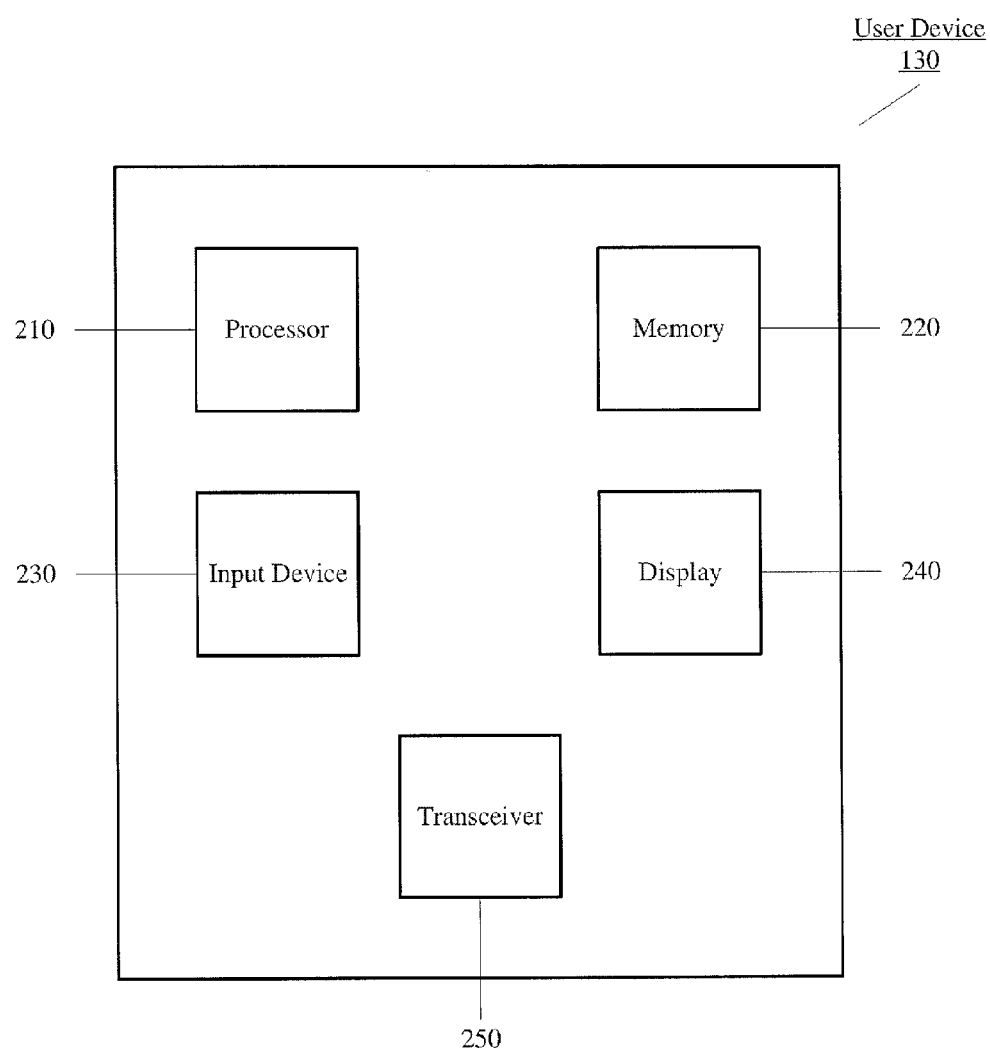
FIG. 2 shows a user device that connects to a host of FIG. 1 for the fantasy sport application according to an exemplary embodiment of the present invention.
Figure 3:
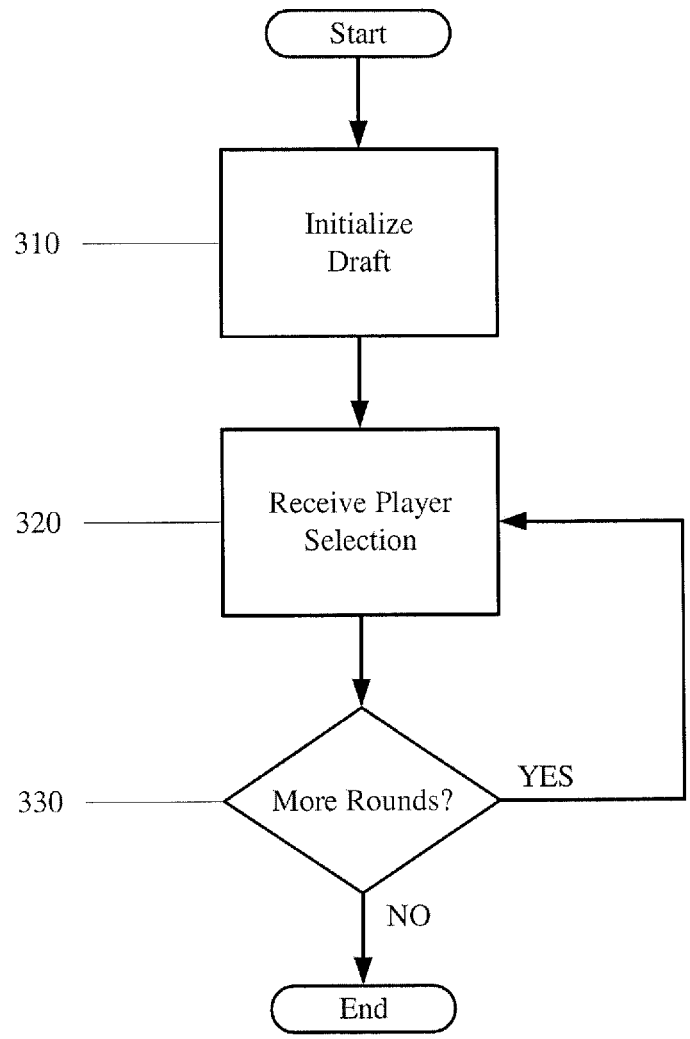
FIG. 3 shows a first conventional method for executing a fantasy sport application to draft players.
Figure 4:
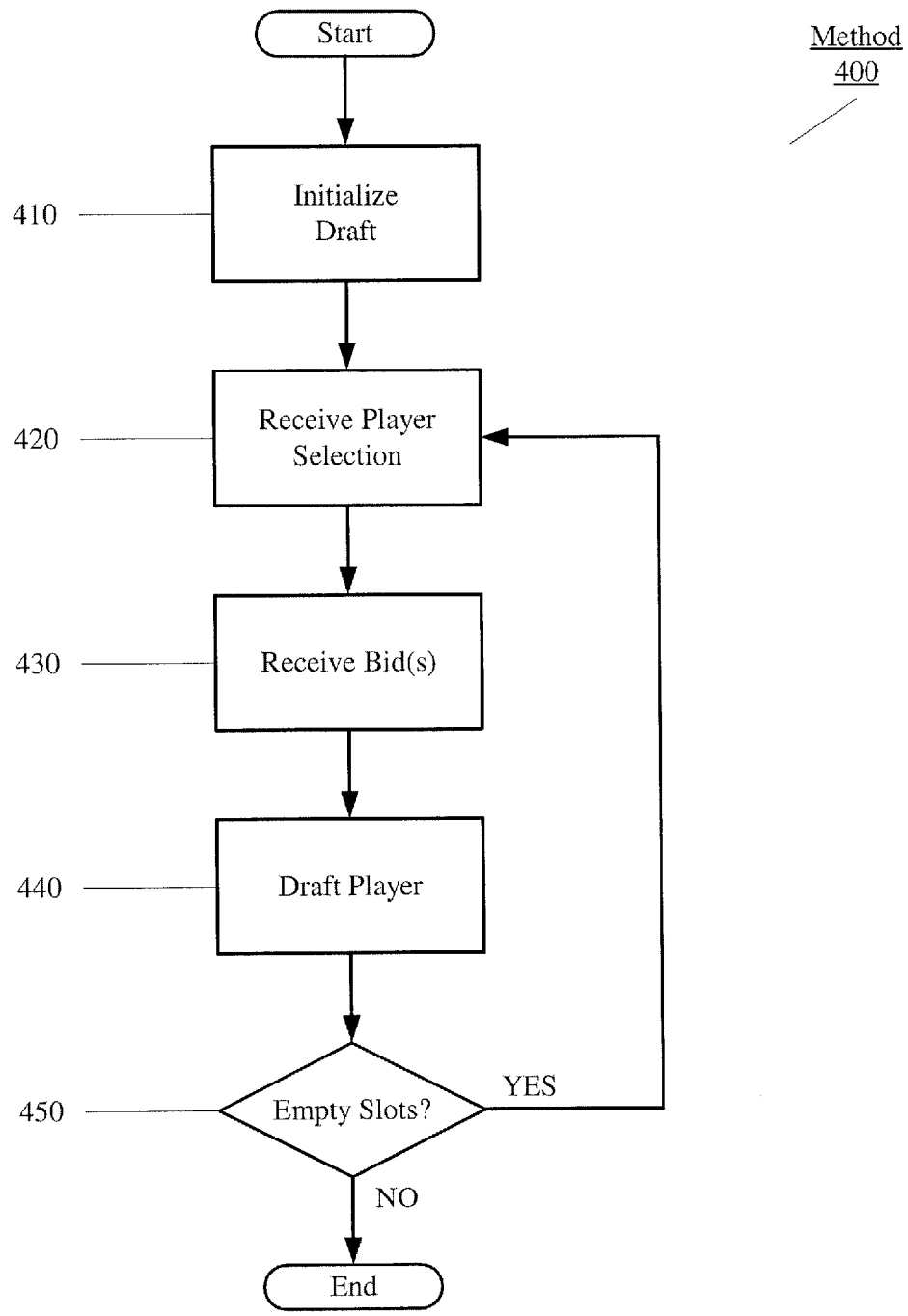
FIG. 4 shows a second conventional method for executing a fantasy sport application to draft players, where the method depicted is an auction-style draft.

FIG. 2 shows one of the user devices 130 that connects to the host 110 and shows the interface for the fantasy sport application according to an exemplary embodiment of the present invention. The user device 130 may be any electronic device such as a computer terminal, a laptop, a personal digital assistant, a tablet, a cellular phone, etc. The user device 130 may also operate using any operating system such as Windows, Mac OS, Linux, Android, iOS, etc. That is, the recommendation engine according to the exemplary embodiments of the present invention may be adapted for any platform used by the user device 130. It should also be noted that the recommendation engine according to the exemplary embodiments of the present invention may also be adapted to any fantasy sport game that is run on the host 110. The user device 130 may include a processor 210, a memory 220, an input device 230, a display 240, and a transceiver 250. It should be noted that the user device 130 may include further components such as when the user device is a portable electronic device, a power supply may be included. It should also be noted that the input device 230 and the display 240 may be embodied together, for example, in a touch screen configured to perform both functionalities.

The processor 210, the memory 220, the input device 230, the display 240, and the transceiver 250 may all provide conventional functionalities for the user device 130. For example, the processor 210 may execute the interface for the fantasy sport application. In another example, the processor 210 may execute a browser application in which the fantasy sport application is executed thereon. The transceiver 250 may exchange data through the network 120 with the host 110, in particular to receive data related to the fantasy sport application as well as the recommendations generated by the recommendation engine, as will be discussed in further detail below.

Figure 5:
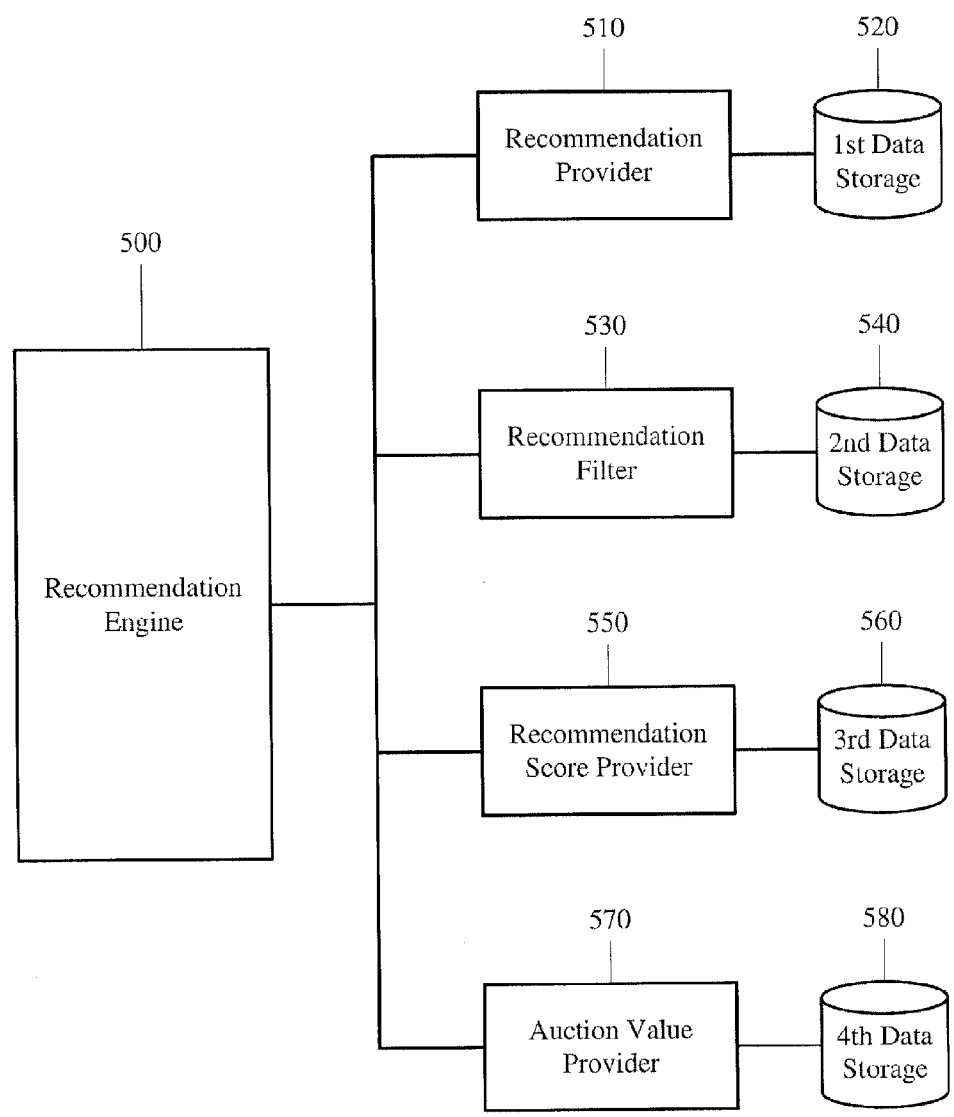
FIG. 5 shows a recommendation engine according to an exemplary embodiment of the present invention.

While performing the draft as described in one of the methods above, the host may include a recommendation engine that provides one or more recommendations for the users to determine an optimal selection of one or more players. FIG. 5 shows a recommendation engine 500 that is configured to provide the recommendations according to an exemplary embodiment of the present invention. The recommendation engine 500 may be incorporated as part of the host 110 or may be a separate utility of the fantasy sport application. The recommendation engine 500 may also be configured to access or be connected to a plurality of data sources. For example, the data may be related to past ranking values of a player as a function of performance from previous seasons. In another example, the data may be related to current ranking values of a player as assessed by other leagues in the sport of the fantasy sport application. In yet another example, the data may be related to ranking values as determined by "experts" in the sport. It should be noted that there are many other sources of data that provide ranking values of players that the recommendation engine may consider prior to generating the recommendations to the users 140.

Those skilled in the art will understand that there is difficulty in merging recommendations and suggestions from multiple sources while drafting a fantasy team. For example, it may be unclear as to how the ranking values provided by the plurality of sources should be ordered or considered in order to provide an optimal recommendation to the user 140. Thus, according to the exemplary embodiments of the present invention, for each decision the user 140 must make for a player to be selected in a draft, the recommendation engine 500 offers a recommendation to the owner. For example, during a draft, of all the players available for drafting, the recommendation engine 500 provides the owners 140 with a ranked list of suggested players to be drafted. Each player's rank on this recommendation list may be determined by a weighted calculation of several rankings that are received by the recommendation engine 500 from the plurality of data sources. For example, the recommendation engine may receive three player rankings applicable to the owner's situation where one may result from a query of available players obtained from a predetermined ranking list picked by a human expert, one may be from a ranking list prepared by a computer implemented method using one set of statistics, and one may be from another computer implemented method using a different set of statistics.

Therefore, according to the exemplary embodiments of the present invention, the recommendation engine 500 may be configured to generate a recommendation list. The recommendation list may include a single recommendation for one sport player or a plurality of recommendations for a plurality of sport players. The recommendation list may be determined by the recommendation engine 500 from incorporating data from multiple sources and calculating an overall or final ranking value of a player. Upon determining the final ranking values of the players, the recommendation engine 500 may sort or order the players, for example, from highest ranking value to lowest ranking value on the recommendation list. Thus, when a user views the recommendation list, for example, on the display 240, the user is readily able to recognize which player would be optimal for drafting.

Figure 6:
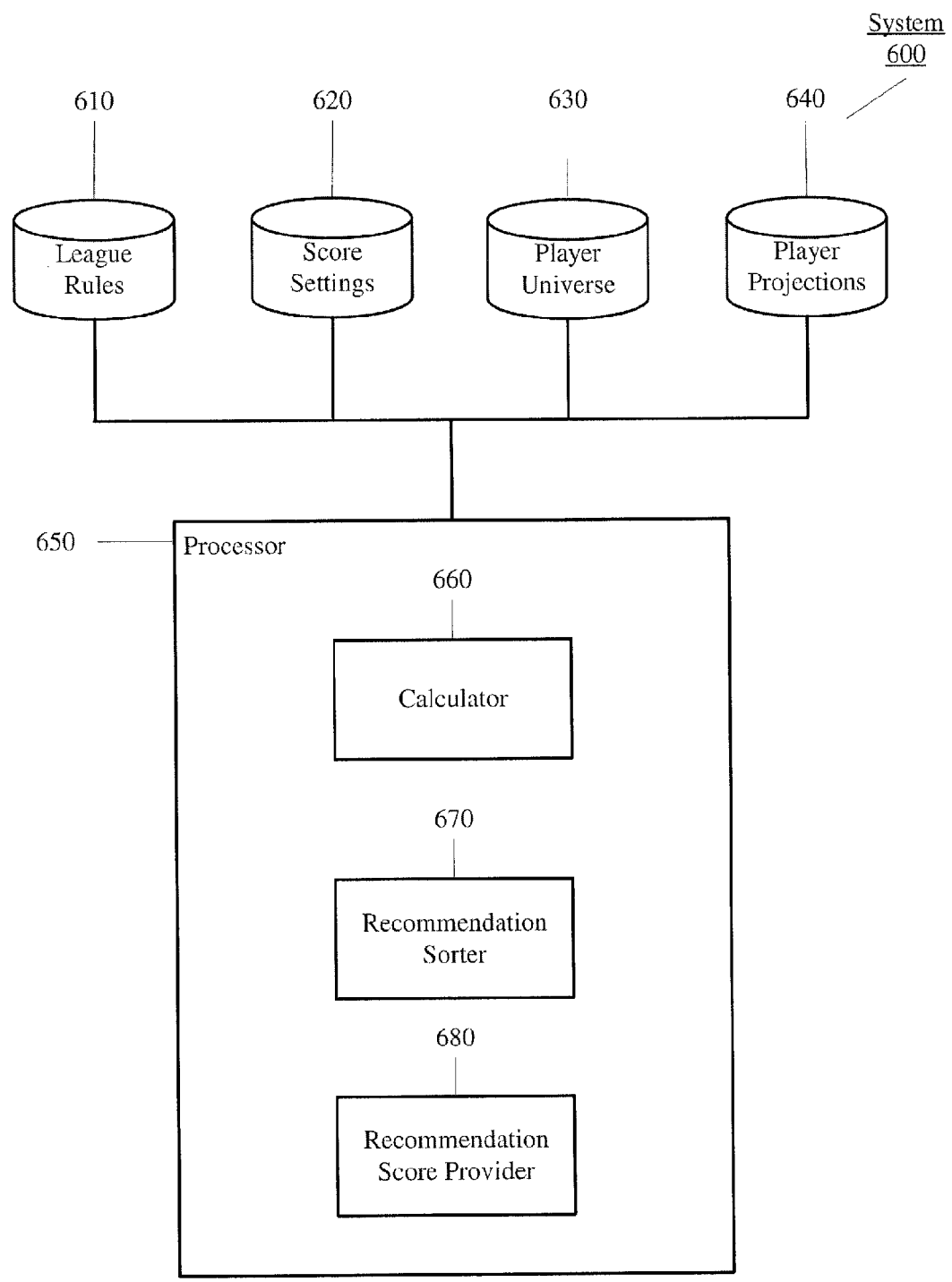
FIG. 6 shows a system to determine a static value for a player according to an exemplary embodiment of the present invention.

According to the exemplary embodiments of the present invention, each candidate player may receive a recommendation value based on a weighted calculation of the three ranking values. It should again be noted that the recommendation engine 500 may receive less or more than three ranking values to be weighted and considered. Each ranking value receives a different weight depending on, for example, static and dynamic factors. An example of a static factor is how well the particular ranking value has worked in the past (e.g., the ranking values of an expert with a better track record may be weighted more heavily than one with a lesser record). FIG. 6 shows a system 600 to determine a static value for a player according to an exemplary embodiment of the present invention. To determine the static value of a player, the system 600 may receive data from a plurality of sources such as a set of league rules 610, score settings 620, a player universe 630 respective of the sport, and player projections 640. Upon receiving this data, a processor 650 may include a calculator 660 to determine the values of each player. The processor 650 may also include a sorter 670 to sort the players as a function of the values of each player. The processor 650 may further include a generator 680 to create a list of the players after the sorter 670 has arranged the players.

A dynamic factor is defined to be one that depends on the current state of the draft and may change at any point throughout. An example of a dynamic factor is the value of a player in the player universe 630 compared to the projected set of players available after the draft is complete. Upon receiving selections during the draft, the recommendation engine 500 may recalculate the state at the end of the draft, changing the value for each non-drafted player in the player universe 630. Once the weighted scores have been calculated for each player, the recommendation engine provides the recommendation list to the user 140.

According to the exemplary embodiments of the present invention, there may be two distinct weights to consider. The first may be the weight assigned to a particular recommendation source. Different sources may provide recommendations of different utility, which may be one manner in which to account for the differences among them. The host 110 or the administrator of the fantasy sport league may assign this weight statically or manually, or dynamic factors may be used such as a historical utility of a particular recommendation source. The second may be the weight assigned to one of the several recommendations produced by the recommendation source during the current recommendation request. Each recommendation source may produce one or more recommendations upon a request from the remainder of the system. Each of these recommendations may have a score value that is dependent upon the degree to which that source prefers the selection of the recommended player. By comparing the score from each of the several recommendations produced during a single request, it is possible to find a normalized score for the recommended player.

Thus, according to the exemplary embodiments of the present invention, the recommendation engine 500 may be a pluggable weighted recommendation provider that considers a variety of sources, and applies a weight value and scoring criteria to compute a set of recommendations that represent optimal, available recommendations across all of the sources. It is noted that the term "pluggable" refers to the ability to "plug in" a plurality of different algorithms in order to support different user preferences or different suggestions. That is, the recommendation engine 500 may be contoured accordingly as a factor of any criteria that the league running the fantasy sport application requires. It should also be noted that the term "weight" refers to a concept that each of the algorithms carries a weight value that reflects a strength in which the recommendation from the source is to be considered. Thus, a higher weight value indicates that the ranking value from a particular source may be incorporated with a greater consideration than a ranking value from another source with a lower weight value.

It should be noted that the recommendation engine 500 may also provide recommendations for further considerations by the user beyond the initial draft in the fantasy sport application. For example, during the course of the season, the user 140 may have to determine which players to put in a starting line-up, which players to suggest or accept in a trade, etc. The recommendation engine 500 may be configured to provide recommendations at each decision making step for the users, as will be described in further detail below.

For the recommendation engine 500 to ultimately generate the recommendation list, the recommendation engine 500 may utilize a plurality of processors that provide data thereto. As illustrated in FIG. 5, the plurality of processors may include a recommendation provider 510 connected to a first data storage 520, a recommendation filter 530 connected to a second data storage 540, a recommendation score provider 550 connected to a third data storage 560, and an auction value provider 570 connected to a fourth data storage 580. As described above, the recommendation engine 500 uses a weighted calculation of multiple ranking techniques to make a final recommendation. Because the recommendation engine is designed with multiple componentized interfaces, additional ranking techniques and weights to the system may be added easily by, e.g., the owner. If required, further processors may also be incorporated for the recommendation engine 500. The recommendation provider 510, the recommendation filter 530, the recommendation score provider 550, and the auction value provider 570 will be described in further detail below.

Figure 7:
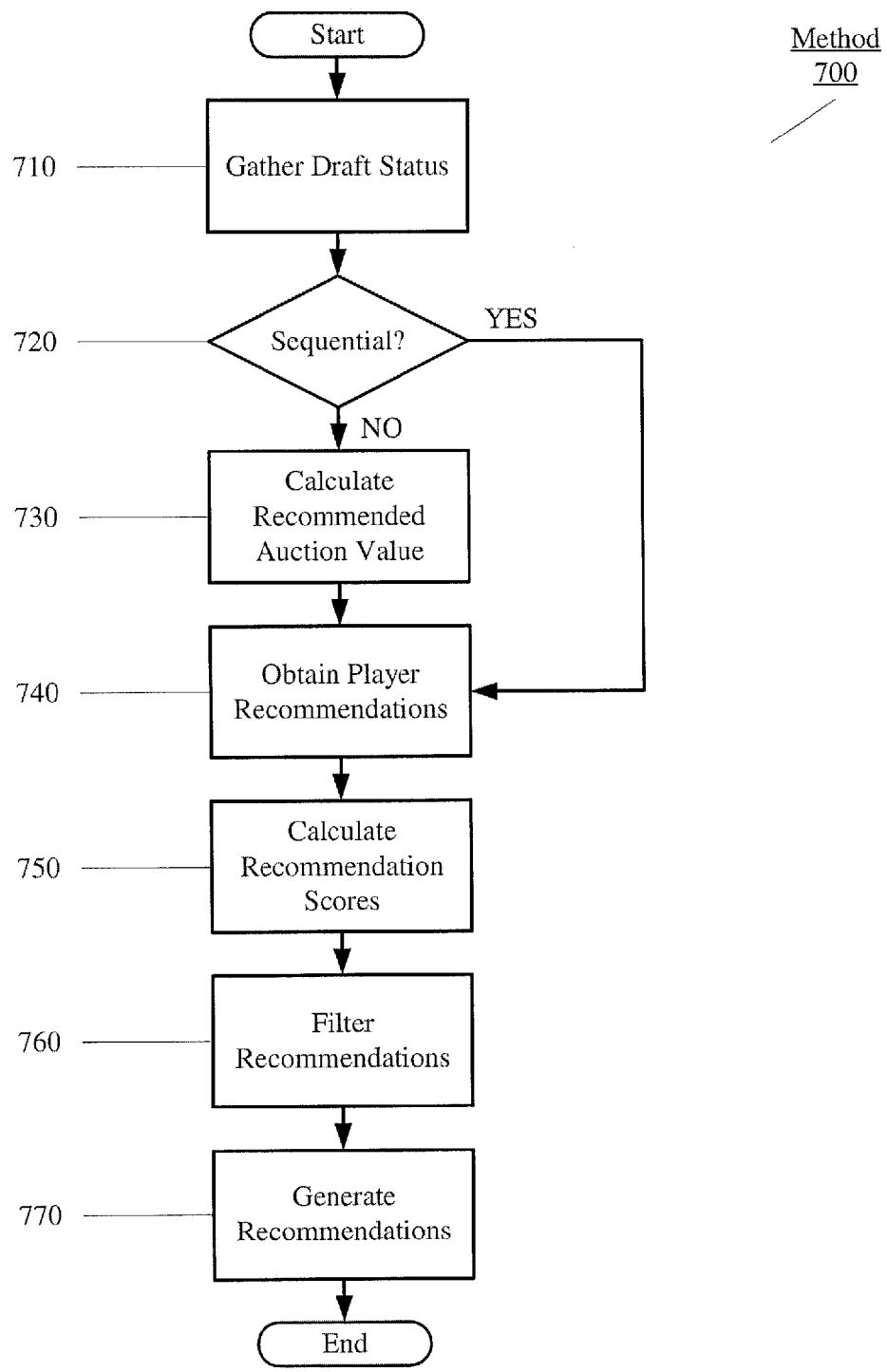
FIG. 7 shows a method of providing recommendations for a fantasy sport application according to an exemplary embodiment of the present invention.

FIG. 7 shows a method 700 of providing recommendations when executing the fantasy sport application according to an exemplary embodiment of the present invention. The method 700 is an overall, general method that may be applied for providing the recommendations to any fantasy sport application, regardless of format.

In step 710, the host 110 may gather the draft status data as required. That is, this step may relate to an initial gathering of data related to the draft such as user information, team information, etc. In step 720, a determination is made whether the draft for the fantasy sport application is a sequential type (e.g., "serpentine") or an auction type. If the determination in step 720 indicates that the draft is an auction type, the method 700 continues to step 730. In step 730, a recommended auction value may be calculated for the selected player who is up for bid. Then, the method 700 continues to step 740. Returning to step 720, if the determination in step 720 indicates that the draft is a sequential type, the method also continues to step 740.

In step 740, the host 110 obtains player recommendations. As discussed above and in further detail below, the recommendation engine 500 may receive a plurality of ranking values related to each player in the respective sport. Also as discussed above and in further detail below, the recommendation engine 500 may incorporate weights to the ranking values related to each player. Accordingly, the player recommendations may be obtained by the host 110. In step 750, the host 110 may calculate recommendation scores as a function of the ranking values and the weights of the ranking values as determined in step 740. In step 760, the recommendations may be filtered prior to generating a recommendation list, for example, as provided by the recommendation filter 530, which will be discussed in further detail below. In step 770, the recommendation list may be generated and provided, taking into account further factors and criteria such as aesthetics, which will also be discussed in further detail below.

Figure 8:
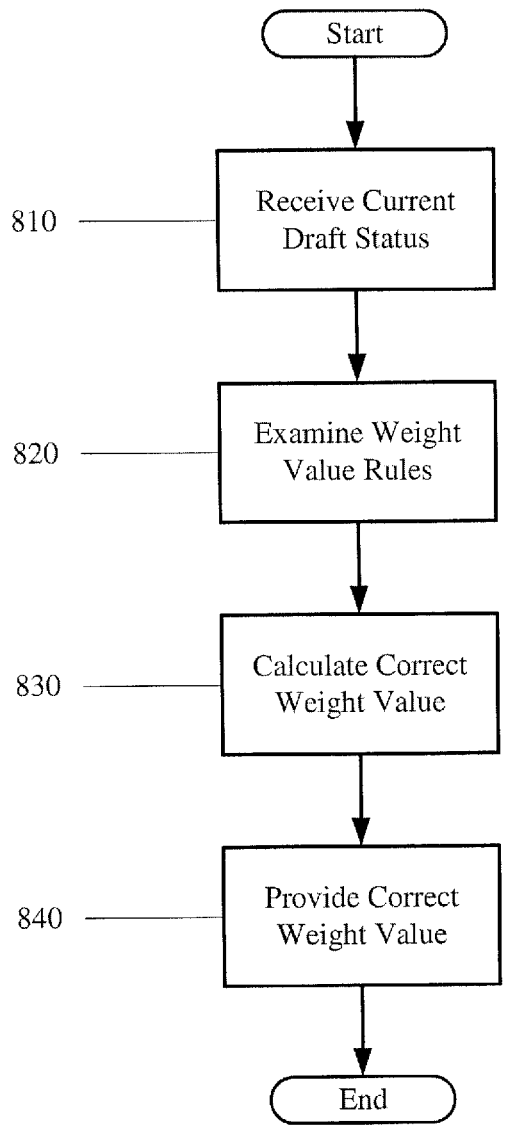
FIG. 8 shows a method for providing a weight value according to an exemplary embodiment of the present invention.

FIG. 8 shows a method 800 for providing a weight value according to an exemplary embodiment of the present invention. As discussed above, the recommendation engine 500 may incorporate weight values to each of the ranking values received from the plurality of sources of rank data. The weight values to be assigned to each of the ranking values may be adjusted by considering a variety of factors, for example, static and dynamic factors. For example, the static factors include data which is calculated prior to the draft and which does not change during the draft. On the other hand, the dynamic factors may be, e.g., data which is calculated prior to the draft, but which changes as the draft progresses. The method 800 incorporates these various factors to provide a correct weight value to be applied to the ranking values.

In step 810, the host 110 receives the current draft status data. For example, if the draft is just beginning, the weight values to be used may be different than when the draft is concluding. Those skilled in the art will understand that a particular player may receive ranking values from a source that only considers a new draft that has not begun and thus, the current draft status may provide a differentiation value to be applied to the weight values. For example, a ranking may be created which relies upon the projected final state of the draft. This ranking would be more accurate later in the draft, so its weighting may increase. In one embodiment, the system owner configures the possible weightings before the draft, such that each of the several weightings is used during a specified part of the draft. In another embodiment, the weighting is determined automatically by a calculation where the number of draft picks remaining is used as input.

In step 820, the host 110 examines the rules instituted for the weight values. For example, each league may run differently and include a variety of different rules that are considered in determining how the weight values are to be applied to every situation. In step 830, the host 110 calculates the adjust weight value as a function of the current draft situation so that in step 840, the correct weight value is provided for application to the plurality of ranking values received by the host 110. Each of the several weighting rules may specify the manner in which the weighting values are to be obtained. In one embodiment, a list of values is provided by the system owner, and these values are used proportionally throughout the draft. For example, if there are 10 values provided, each is used for one-tenth of the draft. In another embodiment, the system owner provides two possible values and a point in the draft, after which the second value is to take effect. For example, the values may be 0 and 1, where 0 disables the ranking entirely, and the point in the draft might be pick number 100. In this case, the ranking system would be disabled before 100 picks had occurred and enabled (and given a weighting of "1") after 100 picks had been made.

As discussed above, the recommendation list generated by the recommendation engine 500 may incorporate a variety of different factors to determine the relative order of each player in the recommendation list. As described above, one such factor is the weight value to be applied to ranking values from the data sources received by the recommendation engine 500. The exemplary embodiments of the present invention may further consider a variety of other factors in generating the recommendation list.

As described above, in determining the weight values, a consideration is the current draft status. Certain recommendation algorithms are more appropriate at different times during the draft. For example, a recommendation based upon the projected rotisserie standings is relatively useless early in the draft while teams are still in the early stages of formation. However, later in the draft when the fantasy team has developed with players being selected, the projected rotisserie standings may be very useful, particularly when making the final few selections. The recommendation engine 500 may allow each algorithm to specify a weight value that should be used for its recommendations in which the weight value changes depending upon the circumstances of the draft such as the stage of the draft currently.

Figure 9:
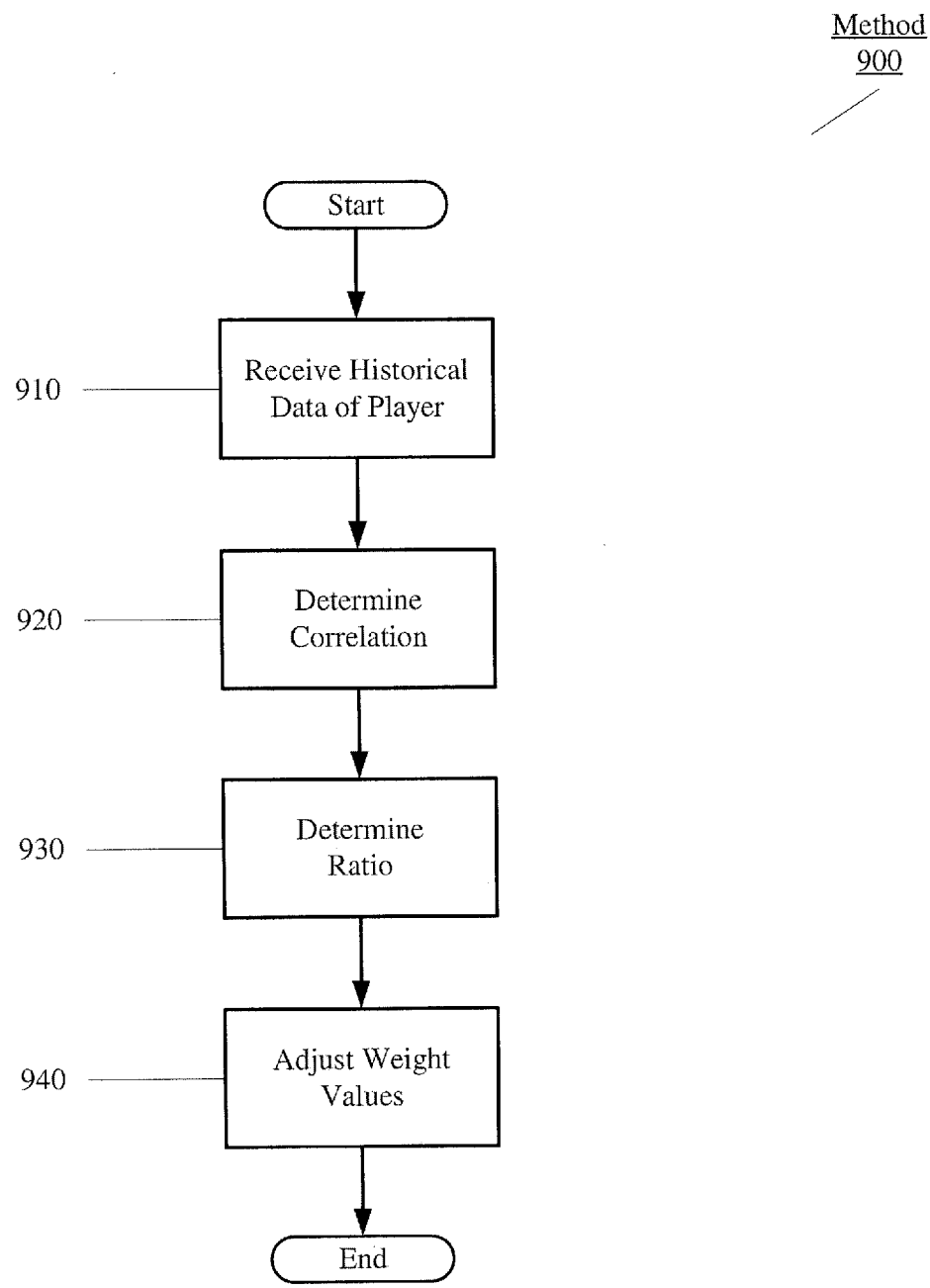
FIG. 9 shows a method that incorporates historical data to adjust weight values according to an exemplary embodiment of the present invention.

In another example, the weight values may be adjusted with further factors. For example, historical data may be used as a basis for projecting the weight value correction. FIG. 9 shows a method 900 that incorporates historical data to adjust the weight values to be applied to the ranking values for each player according to an exemplary embodiment of the present invention. Those skilled in the art will understand that a prediction is inherently incapable of being completely accurate so that recommendations based upon projected data is necessarily limited in accuracy. Thus, the method 900 utilizes historical data that is static to provide more accuracy for a projection.

In step 910, the host 110 receives historical data of each player. Specifically, the historical data may include historical projections and historical statistics related to players for previous seasons. For example, the historical projections may include data related to how a particular player was projected to perform; the historical statistics may include data as to how the player actually performed. As described above, the recommendation engine 500 may receive data from a plurality of sources. Although only ranking values were discussed above, another source of data may be historical data.

In step 920, a correlation is determined between the projected values made for a particular player in previous seasons and the actual values that the player accumulated during the respective seasons using, e.g., anyone of conventional techniques to calculate Pearson's correlation coefficient. The host 110 may consider a plurality of projected values during this process. In step 930, a ratio is determined between the projected value and the actual value. As a plurality of projected values may be used, the ratio may be determined between the mean projected value and the actual value.

In step 940, the weight values may be adjusted accordingly as a function of the ratio determined in step 930. The ratios determined in step 930 may be used to temper the recommendations, providing a greater recommendation for a player who had a better ratio than a player who had a worse ratio. For example, a player who had a near 1:1 ratio between the projected values and the actual values may have a better recommendation as the projected values for an unknown season may be determined with a higher accuracy. However, a player who had a wide discrepancy between the projected values and the actual values may be uncertain as to a projected value for an unknown season.

Alternatively, the correlation values 920 may be used in aggregate to determine the predictability of a plurality of statistics. For example, in baseball, the number of "saves" achieved by a pitcher may be particularly difficult to predict before the season, resulting in a lower correlation for that statistic than for the number of "strikeouts." In this case, when ranking recommendations, players' expected contributions in the "saves" category would be given less weight than those in "strikeouts," because the latter are more likely to be reliable.

The ratios 930 may also be used to detect systemic overestimation or underestimation of a particular statistical type. In order to determine whether or not a user's team has accumulated enough projected statistics to win, the recommendation engine will adjust the projected statistics by the ratio 930 computed for each statistical category; this adjusted statistic may then be used for the purposes of making ranking decisions.

According to the exemplary embodiments of the present invention, a further source of data received by the recommendation engine 500 to consider for the recommendation list may be crowd-sourced fantasy draft data. That is, information sourced from the general fan population may be used to help users 140 make better selections during the draft. By considering crowd-sourced data (e.g., average auction value or average draft position across multiple leagues), players that are more (or less) popular than projections and editorial opinions may be determined. For example, players may be recommended more highly if they are being selected in the draft earlier than projections would otherwise suggest. The crowd-sourced data may be obtained as a part of the player recommendations obtained in step 740 (see FIG. 7). The crowd-source data may be obtained, for example, from average draft position or average auction value calculated from sampling a set of leagues and computing a set of averages. In one exemplary embodiment, the crowd-sourced averages are compared to the recommendation lists from other sources to obtain outliers (i.e., players whose crowd-sourced averages differ from recommendation values by more than a preset threshold). This crowd-source data is then weighted with the other recommendations to arrive at a final set of recommended players.

Figure 10:
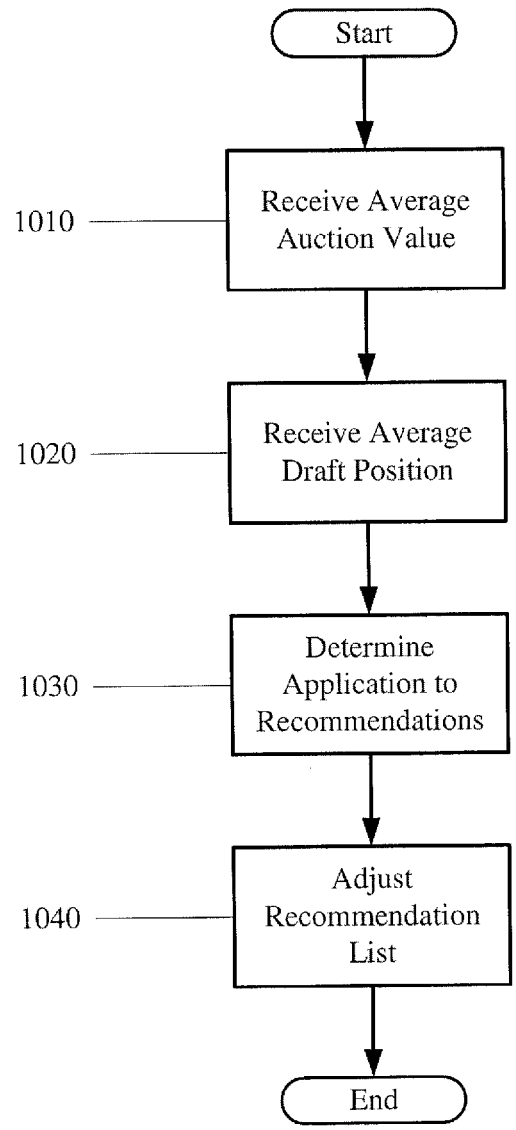
FIG. 10 shows a method that incorporates crowd-sourced fantasy draft data according to an exemplary embodiment of the present invention.

FIG. 10 shows a method 1000 that incorporates this further factor for generating the recommendation list by the recommendation engine 500 according to an exemplary embodiment of the present invention. In step 1010, the recommendation engine 500 receives the average auction value of a player for the current season in which the fantasy sport application is executed. In step 1020, the average draft position of the player for the current season is received by the recommendation engine 500. In step 1030, the recommendation engine 500 determines how these values are to be applied to the ranking values, weight values, score values, or some combination thereof. As discussed above, the crowd-sourced data may supercede other calculated values. Thus, in step 1040, the recommendation list is adjusted by incorporating the data processed herein.

As discussed above, the recommendation engine 500 may be connected to a plurality of processors such as the recommendation provider 510, the recommendation filter 530, the recommendation score provider 550, and the auction value provider 570. The recommendation engine 500 may incorporate calculations provided by these processors to determine the recommendation list to be generated.

Figure 11:
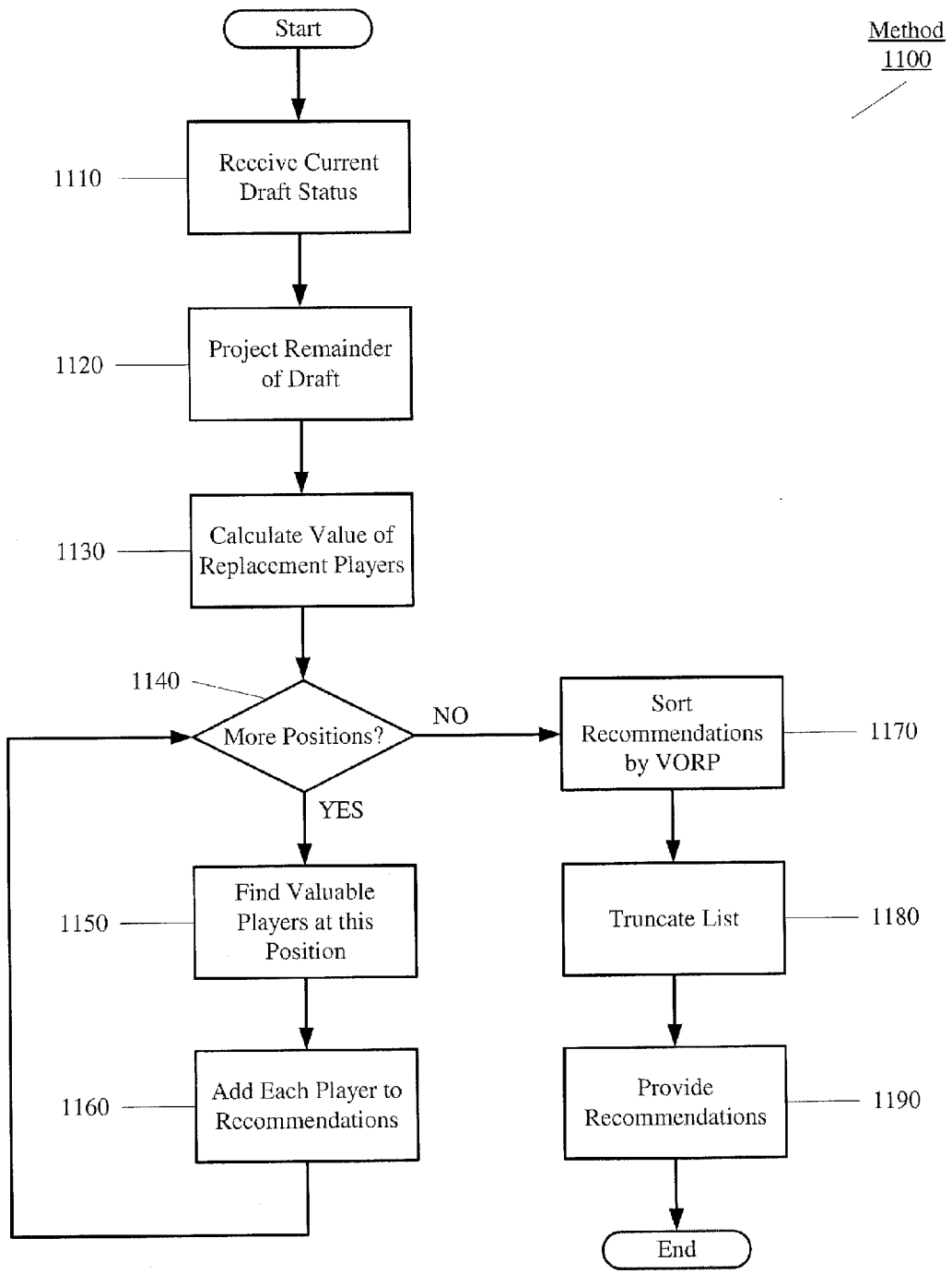
FIG. 11 shows a first method for a recommendation provider to generate recommendations according to an exemplary embodiment of the present invention.

FIG. 11 shows a first method 1100 in which the recommendation provider 510 provides calculations to the recommendation engine 500 to generate the recommendation list according to an exemplary embodiment of the present invention. As was discussed above with reference to the method 800, in step 1110, the recommendation provider 510 receives the current draft status data. In a substantially similar manner as the weight values, the current draft status may affect the calculations provided by the recommendation provider 510. In step 1120, the recommendation provider 510 projects a remainder of the draft. Specifically, utilizing the static player value data as described with reference to FIG. 6 and the player universe data as described above in FIG. 6, the remainder of the draft may be at least partially projected. For example, in one embodiment, the draft selections between this pick and the next pick for the same user may be projected; in another embodiment, the draft may be completely projected, with all remaining draft picks projected. Those skilled in the art will recognize that it may be possible to project a smaller set more accurately than the larger set, and that different techniques may be employed to do the projections in an efficient manner. In step 1130, the value of replacement players may be calculated by the recommendation provider 510. A replacement player refers to the player judged to be most desirable at each of the several sport positions involved in the fantasy league, after first removing the players expected to be drafted by the recommendation provider 510; therefore, the set of replacement players can be seen collectively as the best possible players the owner could use to replace a player on his team at the conclusion of the draft, should he so desire.

In step 1140, a determination is made whether more positions are to be reviewed (e.g., based on the current draft status of step 1110) by the recommendation provider 510. Specifically, as the values of replacement players are calculated in step 1130, the recommendation list may be updated to indicate whether an undrafted player may be more optimal for a fantasy team. If the determination in step 1140 indicates that more positions are to be reviewed, the method 1100 continues to step 1150 where the highly valuable players at a particular position for a respective sport are ascertained (e.g., using static factors related to a particular player) by the recommendation provider 510. The values calculated at step 1130 may be used in this determination. The recommendation provider 510 may also utilize in its determination every player at the position that may provide a more optimal team or may only in its determination a predetermined number of players for this step. In step 1160, the players found in step 1150 are added to the recommendations that the recommendation provider 510 would provide to the recommendation engine 500. Subsequently, the method 1100 returns to step 1140 for a further determination.

Returning to step 1140, if the determination in step 1140 indicates that no more positions are to be reviewed, the method 1100 continues to step 1170 where the recommendations are sorted by the greatest value over replacement player, where the replacement players are determined as discussed above. In step 1180, the recommendation list may be truncated to list only a predetermined number of players. In step 1190, the recommendation provider 510 forwards the recommendations to the recommendation engine 500.

Figure 12:
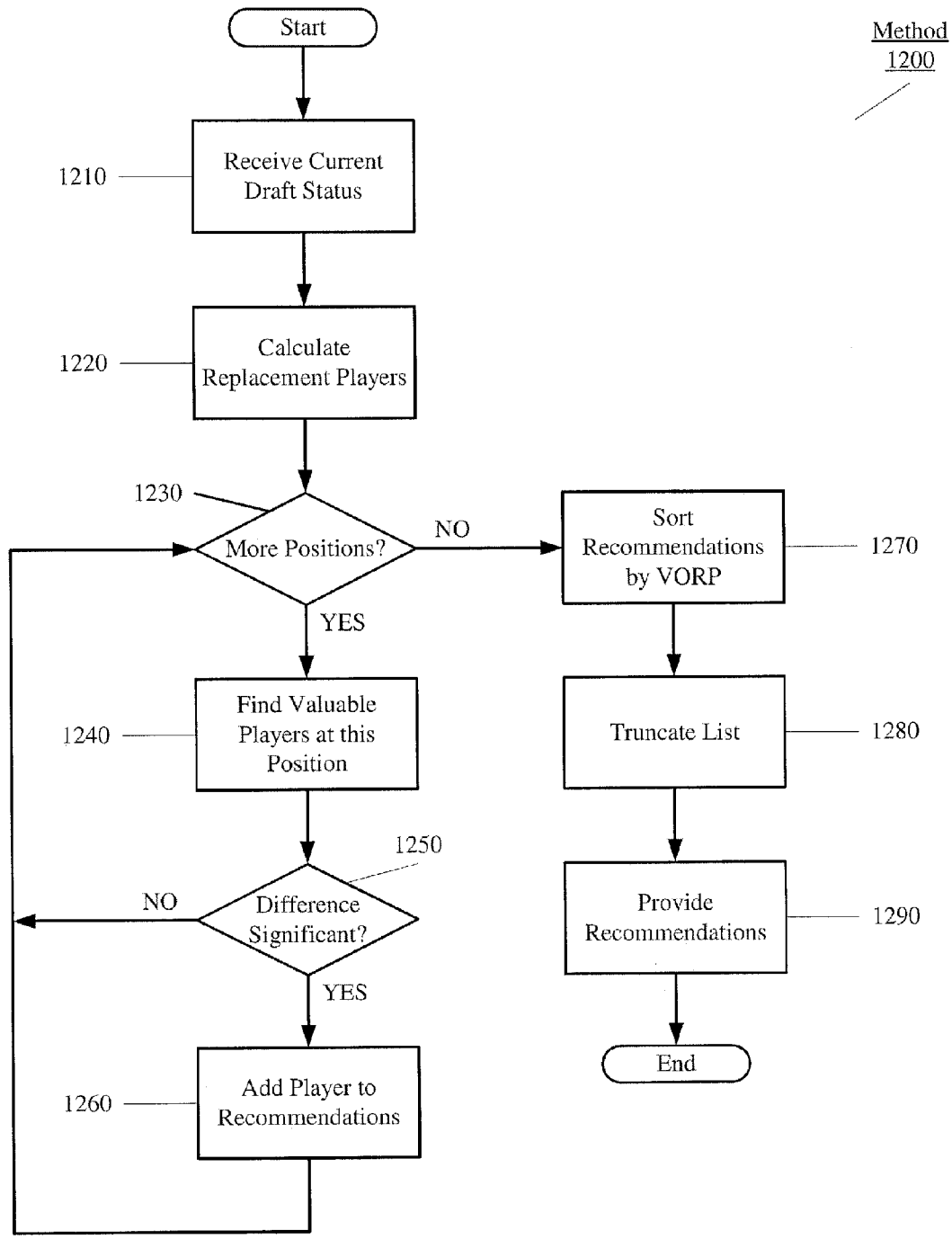
FIG. 12 shows a second method for a recommendation provider to generate recommendations according to an exemplary embodiment of the present invention.

FIG. 12 shows a second method 1200 in which the recommendation provider 510 provides calculations to the recommendation engine 500 to generate the recommendation list according to an exemplary embodiment of the present invention. Again, as was discussed above with reference to the method 800, in step 1210, the recommendation provider 510 receives the current draft status data.

In step 1220, the recommendation provider 510 calculates the replacement players using, for example, a procedure wherein each player is compared to the next-best player at the same particular position for a respective sport. In this case, "replacement" refers to the ability to replace this player with the next-best player if another team drafts this player.

In step 1230, a determination is made whether more positions are to be reviewed. If the determination in step 1230 indicates that more positions are to be reviewed, the method 1200 continues to step 1240 where the most valuable players in the specified position is ascertained by the recommendation provider 510. In step 1250, a further determination is made whether there is a difference between the top player found in step 1240 and the next (replacement) player found in step 1220. If the determination in step 1250 indicates that there is no significant difference between these two players, the method 1200 returns to step 1230. However, if the determination in step 1250 indicates that there is a significant different between these two players, the method 1200 continues to step 1260 where the top player found in step 1240 is added to the recommendations provided by the recommendation provider 510. Subsequently, the method 1200 returns to step 1230 for a further determination of positions to review.

Returning to step 1230, if the determination in step 1230 indicates that no more positions are to be reviewed, the method 1200 continues to step 1270 where the recommendations are sorted by the values over replacement player. In step 1280, the recommendation list may be truncated to list only a predetermined number of players. In step 1290, the recommendation provider 510 forwards the recommendations to the recommendation engine 500.

Figure 13:
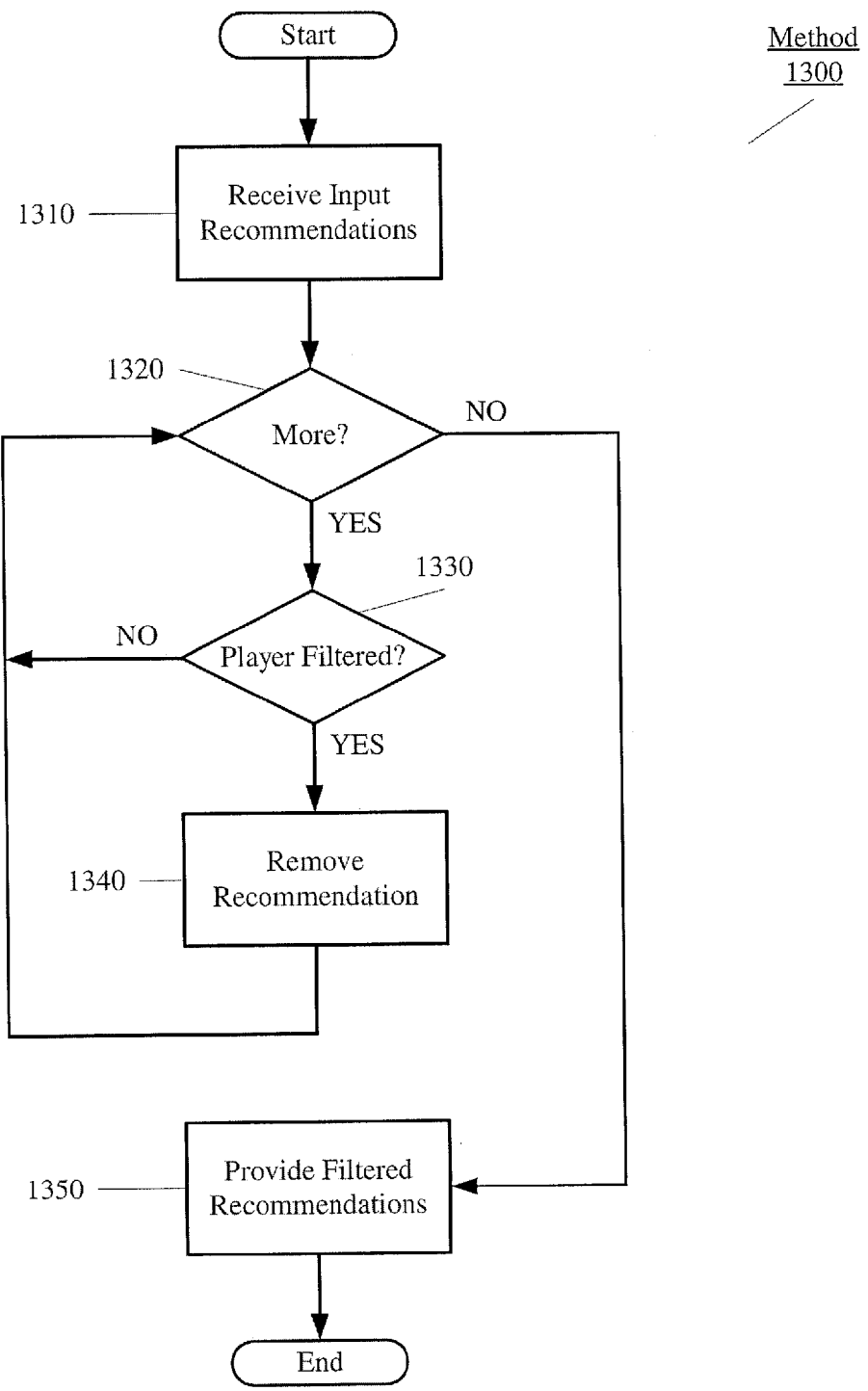
FIG. 13 shows a method for a recommendation filter to remove undesirable recommendations before transmitting the results to the user, according to an exemplary embodiment of the present invention.

FIG. 13 shows a method 1300 in which the recommendation filter 530 provides input to the recommendation engine 500 to generate the recommendation list according to an exemplary embodiment of the present invention. In step 1310, the recommendation filter 530 receives input recommendations. For example, the recommendation filter 530 may receive recommendations from the recommendation engine 500 as a function of recommendations received from the other processors. In step 1320, a determination is made whether more recommendations are to be reviewed (e.g., based on information received in step 1310).

If the determination in step 1320 indicates that more recommendations are to be reviewed, the method 1300 continues to step 1330 where another determination is made whether the player has been filtered. The filter options may be determined, for example, by the administrator of the fantasy sport application. The filters may be related to a variety of different criteria, for example, remove a particular player from being drafted. The filters to be applied to the fantasy game may be stored in the respective data store 540. If the determination in step 1330 indicates that the player is not filtered, the method 1300 returns to step 1320 to determine whether more recommendations are to be reviewed. If the determination in step 1330 indicates that the player is filtered, the method 1300 continues to step 1340 where the player is removed from the recommendation to be provided by the recommendation filter 530. Subsequently, the method 1300 returns to step 1320 to determine whether more recommendations are to be reviewed.

Returning to step 1320, if the determination indicates that no more recommendations are to be reviewed, the method 1300 continues to step 1350 where the recommendations having been filtered are forwarded to the recommendation engine 500.

Figure 14:
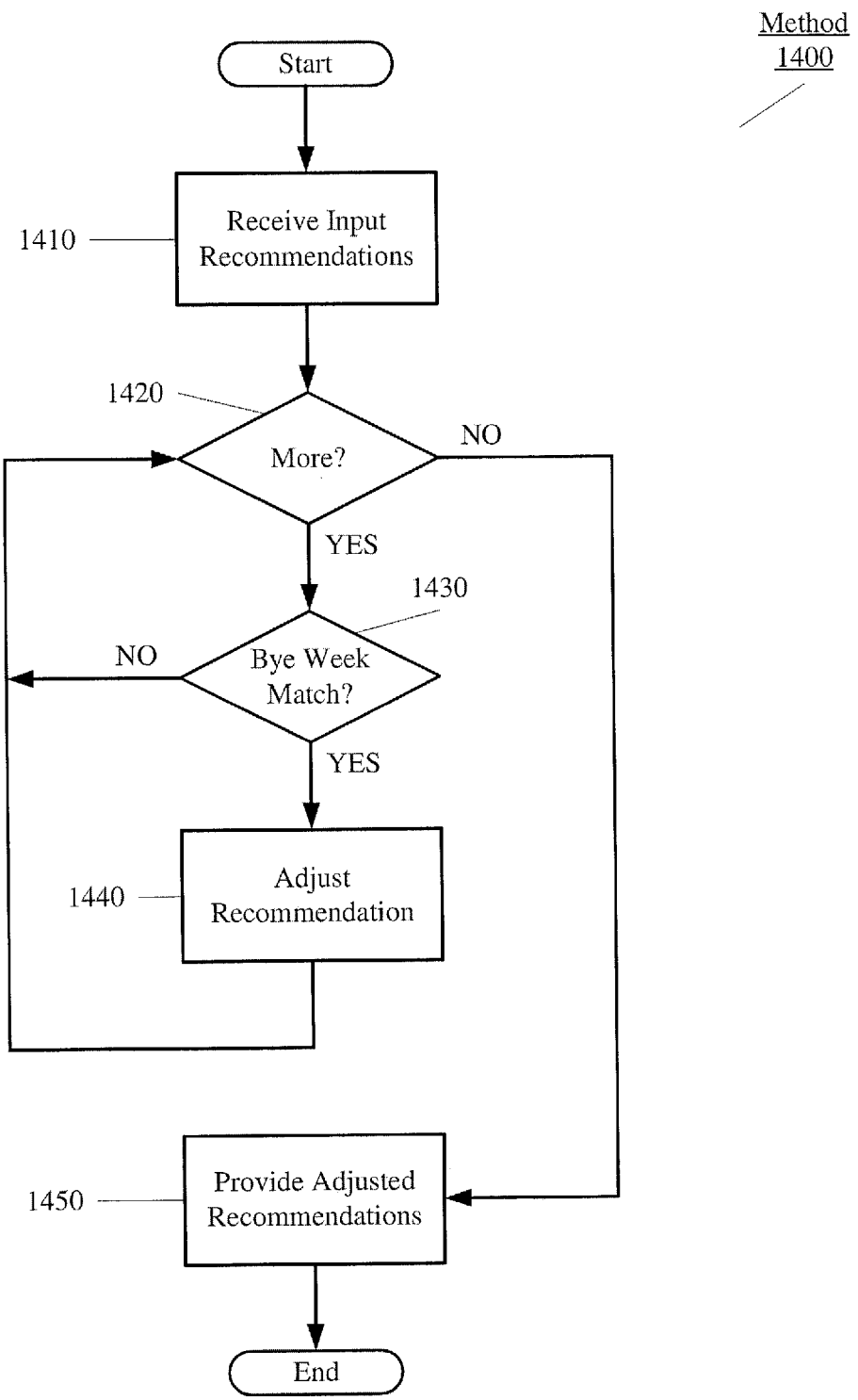
FIG. 14 shows a method for a recommendation score provider to adjust recommendations' scores prior to determination of the final ranking, according to an exemplary embodiment of the present invention.

FIG. 14 shows a method 1400 in which the recommendation score provider 550 provides recommendations to the recommendation engine 500 to generate the recommendation list according to an exemplary embodiment of the present invention. In step 1410, the recommendation score provider 550 receives input recommendations of players. For example, the recommendation score provider 550 may receive recommendations from the recommendation engine 500 as a function of recommendations received from the other processors. In step 1420, a determination is made whether more recommendations are to be reviewed (e.g., based on information received in step 1410).

If the determination in step 1420 indicates that more recommendations are to be reviewed, the method 1400 continues to step 1430 where another determination is made whether the player has a further factor to be considered. For example, as illustrated in FIG. 14, the factor may be whether the player's bye week matches someone already on the roster at the same position. If the determination in step 1430 indicates negatively, the method 1400 returns to step 1420. If the determination in step 1430 indicates affirmatively, the method 1400 continues to step 1440 where the recommendation is adjusted accordingly. For example, with the factor described above, if the player's bye week matches someone already on the roster at the same position, then the recommendation may be decreased in value since such a scenario may be detrimental for the fantasy team of the user 140. Subsequently, the method 1400 returns to step 1420 where another determination is made whether more recommendations are to be reviewed.

Returning to step 1420, if the determination indicates that no more recommendations are to be reviewed, the method 1400 continues to step 1450 where the recommendations having been adjusted are forwarded to the recommendation engine 500.

Figure 15:
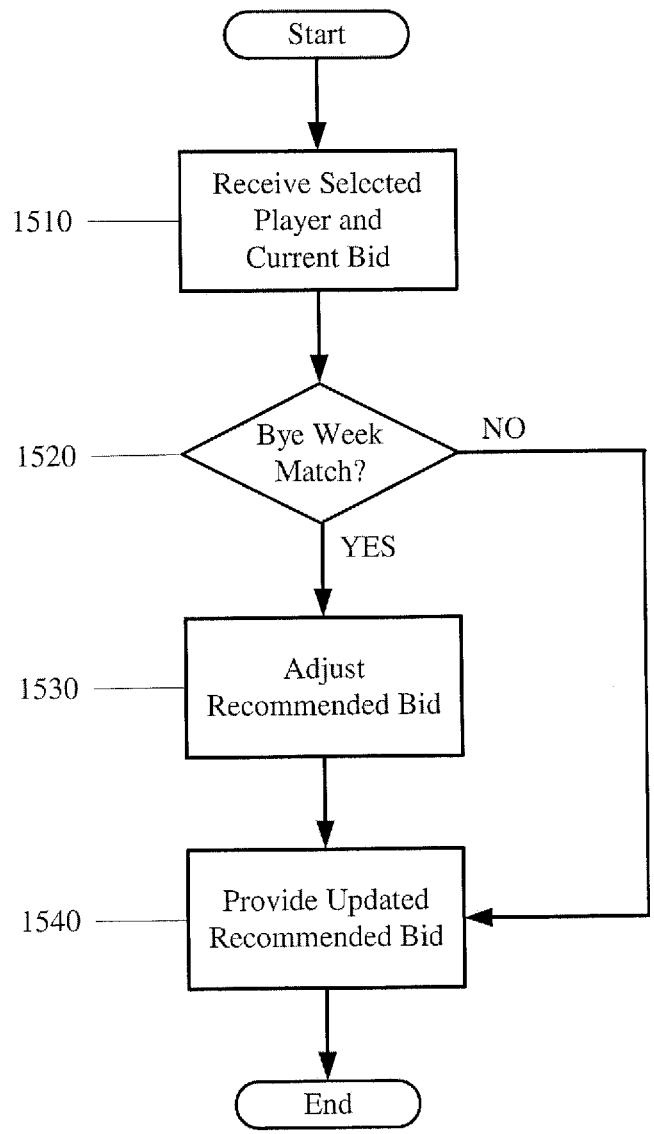
FIG. 15 shows a method for an auction value provider to adjust a recommended auction value, according to an exemplary embodiment of the present invention.

FIG. 15 shows a method 1500 in which the auction value provider 570 provides recommendations to the recommendation engine 500 related to bids for an auction type fantasy draft according to an exemplary embodiment of the present invention. In step 1510, the auction value provider 570 receives data related to the current player on auction and the current recommended bid value that may have previously been determined. In step 1520, a determination is made whether the player has a further factor to be considered. For example, as illustrated in FIG. 15, the factor may be whether the player's bye week matches someone already on the roaster at the same position, which may be determined via a database query of bye weeks. If the determination in step 1530 indicates affirmatively, the method continues to step 1530 where the recommended bid is adjusted accordingly. For example, with the factor described above, if the player's bye week matches someone already on the roster at the same position, then the recommended bid value may be decreased since such a scenario may be detrimental for the fantasy team of the user 140. The method 1400 then continues to step 1540.

Returning to step 1520, if the determination in step 1520 indicates negatively, the method 1500 continues to step 1540. In step 1540, the updated recommended bid value is forwarded to the recommendation engine 500 so that this value may be shown to the user 140 considering to place a bid on the selected player.

Figure 16:
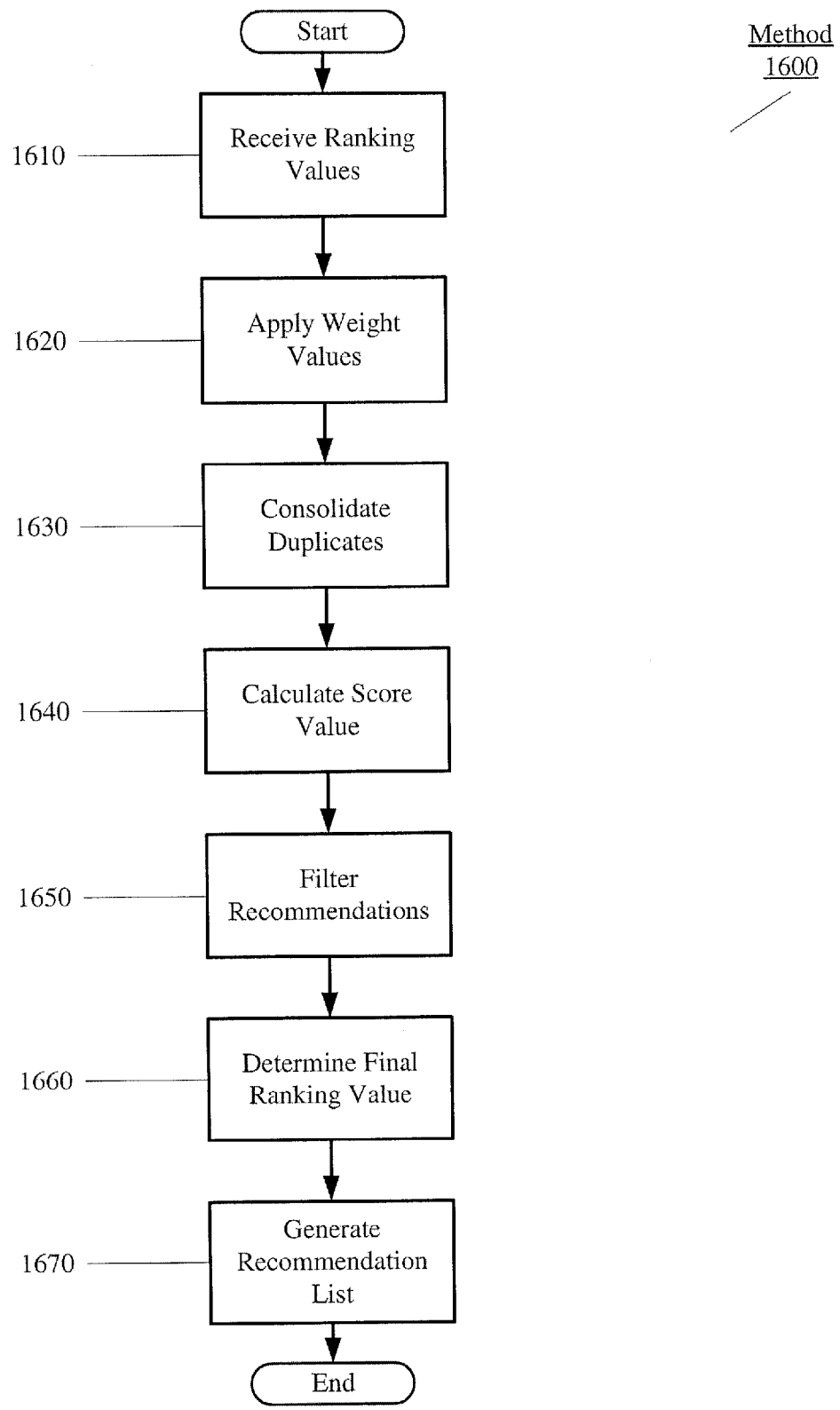
FIG. 16 shows a method for generating a recommendation list according to an exemplary embodiment of the present invention.

FIG. 16 shows a method 1600 for generating a recommendation list by the recommendation engine 500 according to an exemplary embodiment of the present invention. The method 1600 may represent an overall method that incorporates the various criteria used in determining the recommendations. For example, the recommendations, calculations, values, etc. provided by the various processors 510, 530, 550, 570 may be used in the method 1600.

In step 1610, the recommendation engine 500 receives the ranking values. As discussed above, the recommendation engine 500 may have access to or be connected to a plurality of sources. Accordingly, the recommendation engine 500 may receive a plurality of ranking values from a plurality of different sources. The ranking values may be determined by the sources using a plurality of different criteria.

In step 1620, the recommendation engine 500 collates and applies a weight value to each of the ranking values received in step 1610. As discussed above, the weight values may be determined using a variety of different criteria as well as a function of the current draft status. Using these criteria, the weight values may be applied accordingly to adjust the ranking values from the sources. In step 1630, duplicate recommendations may be consolidated so that an incorrect calculation is prevented or an incorrect stressing of a recommendation is prevented.

In step 1640, a score value is computed for each player as a function of the weight values on the ranking values. Specifically, by applying the weight value to a respective ranking value, a score value may be determined. In step 1650, the players in which a recommendation score has been calculated in the previous step may be filtered as a function of the filters set for the fantasy league.

In step 1660, a final ranking value may be determined for each player in the player universe for the respective sport so that the recommendation engine may order the players accordingly and generate the recommendation list in step 1670.

It should be noted that the method 1600 may include additional factors that have not yet been described. For example, an appropriateness value may be applied to a player that is to be added to the recommendation list. The appropriateness value may relate to, for example, a binary factor yes/no. Such a factor may be applied when the player may still be considered in the player universe but would provide no benefit due to, for example, injury, retirement, contract dispute, etc. It should be noted that this value and recommendations thereof may also be embodied as a separate processor similar to those described with reference to processors 510, 530, 550, 570.

Figure 17:
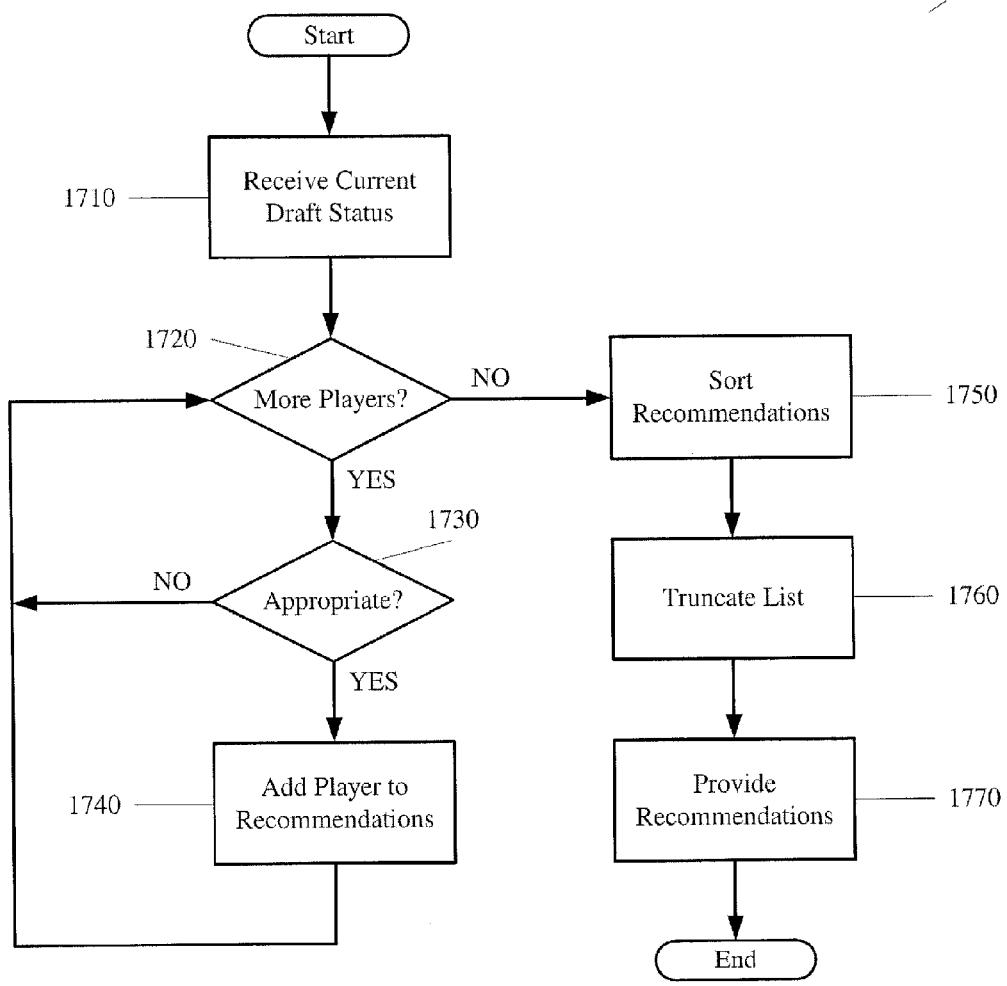
FIG. 17 shows a method for evaluating an appropriateness value according to an exemplary embodiment of the present invention.

FIG. 17 shows a method 1700 for evaluating an appropriateness value for players that are considered for addition to the recommendation list according to an exemplary embodiment of the present invention. In step 1710, the current draft data is received. For example, the draft information may relate to players who have already been drafted. In step 1720, a determination is made whether more target players are to be considered (e.g., based on information received in step 1710).

If the determination in step 1720 indicates that more target players are to be considered, the method 1700 continues to step 1730 where a further determination is made whether the current player is "appropriate" for a recommendation. The player may be appropriate as determined based on a number of pre-selected parameters. As discussed above, many further factors may be considered such as handcuffing. For this particular factor, if the determination in step 1730 indicates negatively, the method 1700 returns to step 1720. If the determination in step 1730 indicates affirmatively, the method 1700 continues to step 1740 where the player is added to the recommendations to be provided to the recommendation engine 500. Subsequently, the method 1700 returns to step 1720.

Returning to step 1720, if the determination indicates that no further players are to be considered, the method 1700 continues to step 1750 where the recommendations are sorted appropriately. Specifically, if the recommendation list already generated by the recommendation engine 500 were provided in step 1710, the recommendation list may be updated after application of steps 1730 and 1740. In step 1760, the list may be truncated to a predetermined size and in step 1770, the updated recommendations may be provided to the recommendation engine 500.

Figure 18:
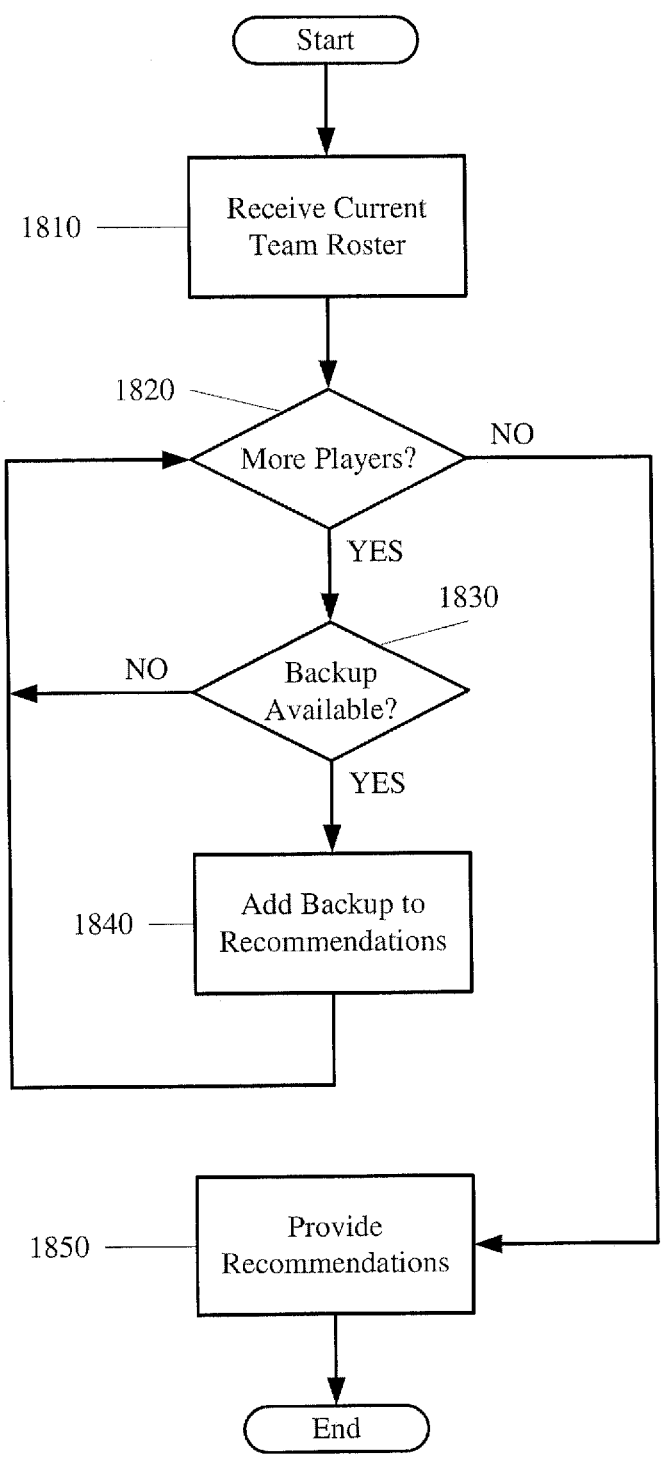
FIG. 18 shows a method for incorporating a handcuffing principle for a recommendation list according to an exemplary embodiment of the present invention.

As described above, another factor that may be considered may be handcuffing. The recommendation engine 500 may include a feature to include this consideration when generating the recommendation list. FIG. 18 shows a method 1800 for incorporating a handcuffing principle for the recommendation list according to an exemplary embodiment of the present invention. As discussed above, the method 1800 may also relate to a processor that provides recommendations to the recommendation engine 500 in a manner substantially similar to the processors 510, 530, 550, 570.

In step 1810, a current fantasy team roster data is received. Since handcuffing is a principle related to one fantasy team, step 1810 relates to a single team. In step 1820, a determination is made whether more target players from the fantasy team roster are to be reviewed. If the determination in step 1820 indicates that more players are to be reviewed, the method 1800 continues to step 1830 where a further determination is made whether a primary backup for a target player is still undrafted. If the determination in step 1830 indicates negatively, the method 1800 returns to step 1820. If the determination in step 1830 indicates affirmatively, the method 1800 continues to step 1840 where the primary backup player is added to the recommendations provided to the recommendation engine 500. Subsequently, the method 1800 returns to step 1820.

Returning to step 1820, if the determination indicates that no further players are to be reviewed, the method 1800 continues to step 1850 where the recommendations are provided to the recommendation engine 500 so that the recommendation list may be generated.

The exemplary embodiments of the present invention have been described in particular to a draft environment of the fantasy sport application. However, it is noted that the recommendation engine 500 may also be applied to a variety of other features of the fantasy sport application. For example, the operation mode of the recommendation engine 500 may also be related to an in-season transaction such as a trade or the acquisition a replacement player not currently assigned to any fantasy team.

Figure 19:
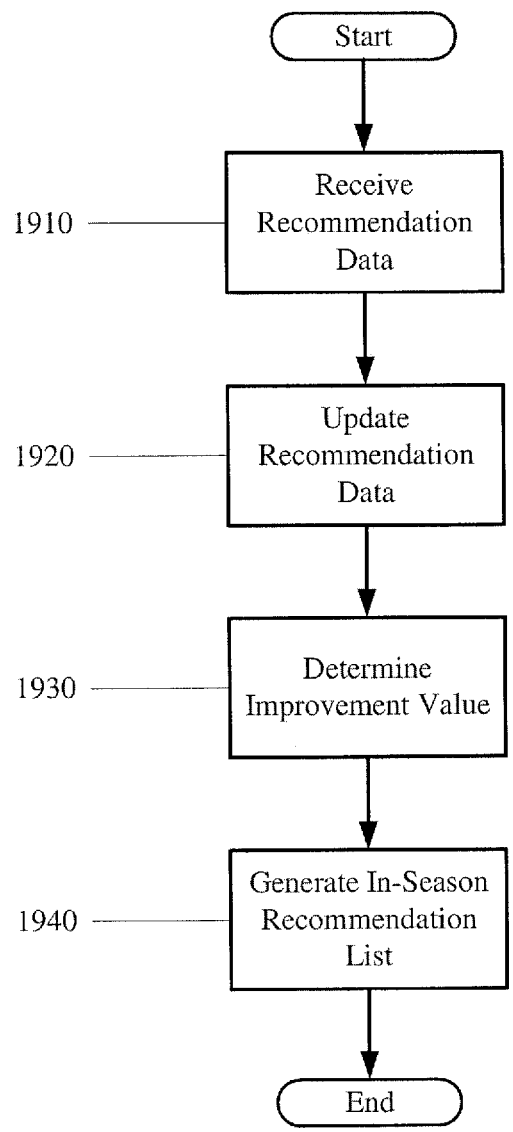
FIG. 19 shows a method for generating a recommendation list for an in-season scenario according to an exemplary embodiment of the present invention.

FIG. 19 shows a method 1900 for generating a recommendation list by the recommendation engine 500 for an in-season scenario where recommendations are needed according to an exemplary embodiment of the present invention. Initially, it is noted that data sources for ranking values that provide no substantially valuable input may be removed from this process. Specifically, some data sources for ranking values may only be pertinent during the draft. The interface for the fantasy sport application may include an option for adjusting accordingly. The interface may automatically make the change or the option may be entered manually. It should also be noted that the removal or addition of data sources for ranking values may be manually performed so that the user 140 controls how the recommendations are to be provided. Those skilled in the art will understand that for an in-season scenario, changes to a (usually full) fantasy team rather than simply adding to a (not yet full) team requires modification. Also as noted above, the method 1900 may be part of a processor that provides recommendations in a manner substantially similar to the processors 510, 530, 550, 570.

In step 1910, recommendation data may be received for further computations. Although previously indicated that draft recommendation data may be irrelevant, the method 1900 may incorporate recommendation data at the time of the draft as a basis for a subsequent update to apply to the in-season scenario. The recommendation data may also be from only relevant ranking value sources.

In step 1920, the recommendation data is updated with current factors that affect the recommendation data such as an adjusted weight. In step 1930, an improvement value is determined for a replacement player at a particular position for the respective sport. It should be noted that the improvement value may be adjusted accordingly for the in-season scenario. In step 1940, the recommendations may be provided to the recommendation engine 500 so that an in-season recommendation list is generated and provided. Thus, replacing a player with someone who is a weaker candidate will receive a negative score to indicate that such a replacement is not recommended while replacing a player with someone who is a stronger candidate will receive a positive score to indicate that such a replacement is recommended. It should be noted that the in-season operation mode may also consider any and all of the factors and criteria discussed above and respectively applied to an in-season scenario.

The exemplary embodiments of the present invention provide a recommendation engine that receives a plurality of different ranking values from a plurality of different sources so that a recommendation list may be generated as a function of these plurality of sources. The recommendation engine may include weight values that are applied to each of the ranking values related to a particular player so that a score value is determined. The score values may then be used to determine a final ranking value for each of the players in a player universe for a respective sport so that the recommendation list may be generated.

The exemplary embodiments of the present invention provide advantages over conventional systems. For example, the recommendation calculations may be coalesced into a human-readable explanation in favor of the recommendation. More specifically, the system may generate a narrative which explains one or more of the most heavily weighted factors in the ranking of the player. The narrative may also include each separate recommendation source that favors a particular player. The descriptive text may further be arranged by noting that each of the several recommendation sources may have provided a different normalized score, representing the strength of the recommendation as it pertains to that recommendation source. Therefore, the higher the normalized score, the more that the recommendation source may be said to influence the final recommendation of the player in question.

In another example, without specific user direction, the method steps may be performed such that their results are available upon demand. Unlike in-season transactions, which are not typically time-limited except immediately before a professional sporting event begins, draft transactions tend to be fast-paced. In one embodiment, the user may have 90, 60, or even 30 seconds in which to make a selection; in another, a user participating in an auction may have 25 or fewer seconds to decide whether or not to bid. In these situations, having the results available on a tab that updates without user input can save precious seconds, providing a real and substantial benefit to the user of this system.

Those skilled in the art will understand that the above-described exemplary embodiments may be implemented in any number of manners, including, as a separate software module, as a combination of hardware and software, etc. For example, the recommendation engine may be a program containing lines of code that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method for a fantasy sport application, comprising:
operating a computer to perform the following steps:
receiving a plurality of ranking values associated with a sport player;
receiving a current draft status;
assigning a corresponding weight value to each ranking value;
determining a score value as a function of the ranking value and the corresponding weight value;
determining an adjusted ranking value as a function of the score values for the sport player;
generating a recommendation for the sport player as a function of a current draft status and the adjusted ranking value;
performing the above steps for at least one further sport player;
generating a recommendation list for the sport player and the at least one further sport player as a function of the corresponding adjusted ranking values;
determining an adjusted ranking value of a replacement player; and
generating an updated recommendation list including the replacement player when the replacement player has a higher adjusted ranking value than for the sport players already included in the recommendation list.

2. The method of claim 1, wherein the sport players are listed in the recommendation list in an order according to their corresponding adjusted ranking value.

3. The method of claim 1, further comprising:
displaying the recommendation list to a user.

4. The method of claim 1, wherein the weight value is assigned as a function of at least one of a first static weighting based upon a category, a second static weighting based upon the category and a number of successful draft picks, a dynamic weighting based upon a behavior of users, a dynamic weighting based upon a past behavior of users, historical data related to one of the plurality of sport players, and the current draft status.

5. The method of claim 1, wherein the current draft status includes one of a pre-draft status, an in-process draft status and a post-draft status of a draft in the fantasy sport application.

6. The method of claim 1, further comprising:
receiving a set of filter values to be applied to the recommendation list; and
generating an updated recommendation list as a function of the set of filter values.

7. The method of claim 1, further comprising:
determining a factor affecting a fantasy team as a whole;
determining if the factor has one of a positive effect and a negative effect on the fantasy team; and
generating an updated recommendation list as a function of the positive and negative effects.

8. The method of claim 1, wherein, when the fantasy sport application includes an auction draft, the method further comprises:
determining a factor affecting a fantasy team as a whole;
determining if the factor has one of a positive effect and a negative effect on the fantasy team; and
generating a recommendation for a bid on one of the plurality of sport players.

9. The method of claim 1, further comprising:
adding a backup player to the recommendation list, the backup player being related to a selected one of the plurality of sport players.

10. The method of claim 1, further comprising:
adjusting the adjusted ranking value of one of the plurality of sport players when the one of the plurality of sport players has a common bye-week as a selected one of the plurality of sport players.

11. The method of claim 1, the method further comprising the step of:
re-determining the adjusted ranking value further as a function of at least one of an average auction value, an average draft position, and a combination thereof.

12. A device, comprising:
a communication arrangement configured to communicate via a communication network;
a memory arrangement; and
a processor for a fantasy sport application for performing a method:
wherein the processor receives a plurality of ranking values associated with a sport player and receives a current draft status,
wherein the processor assigns a corresponding weight value to each ranking value,
wherein the processor determines a score value as a function of the ranking value and the corresponding weight value,
wherein the processor determines an adjusted ranking value as a function of the score values for the sport player,
wherein the processor generates a recommendation the sport player as a function of a current draft status and the adjusted ranking value
performing the above method for at least one further sport player;
generating a recommendation list for the sport player and the at least one further sport player as a function of the corresponding adjusted ranking values;
determining an adjusted ranking value of a replacement player; and generating an updated recommendation list including the replacement player when the replacement player has a higher adjusted ranking value than for the sport players already included in the recommendation list.

13. The device of claim 12, wherein the sport players are listed in the recommendation list in an order according to their corresponding adjusted ranking value.

14. The device of claim 12, wherein the recommendation list is displayed to a user.

15. The device of claim 12, wherein the weight value is assigned as a function of at least one of a first static weighting based upon a category, a second static weighting based upon the category and a number of successful draft picks, a dynamic weighting based upon a behavior of users, a dynamic weighting based upon a past behavior of users, historical data related to one of the plurality of sport players, and the current draft status.

16. The device of claim 12, wherein the current draft status includes one of a pre-draft status, an in-process draft status and a post-draft status of a draft in the fantasy sport application.

17. The device of claim 12, wherein the processor is further configured to receive a set of filter values to be applied to the recommendation list and generate an updated recommendation list as a function of the set of filter values.

18. The device of claim 12, wherein the processor is further configured to determine a factor affecting a fantasy team as a whole, determine if the factor has one of a positive effect and a negative effect on the fantasy sport team, and generate an updated recommendation list as a function of the positive and negative effects.

19. The device of claim 12, wherein, when the fantasy sport application includes an auction draft, the processor is further configured to determine a factor affect a fantasy team as a whole, determine if the factor has one of a positive effect and a negative effect on the fantasy team, and generate a recommendation for a bid on one of the plurality of sport players.

20. The device of claim 12, wherein the processor is further configured to at least one of (1) add a backup player to the recommendation list in which the backup player is related to a selected one of the plurality of sport players and (2) adjust the adjusted ranking value of one of the plurality of sport players when the one of the plurality of sport players has a common bye-week as a further selected one of the plurality of sport players.

21. The device of claim 12, wherein the processor is further configured to re-determine the final ranking value further as a function of at least one of an average auction value, an average draft position, and a combination thereof.

22. A non-transitory computer readable storage medium with an executable program stored thereon, wherein the program instructs a processor to perform the following operations:
receiving a plurality of ranking values associated a plurality of sport players;
receiving a current draft status;
assigning a weight value to each ranking value;
determining a score value as a function of the ranking value and the respective weight value;
determining an adjusted ranking value as a function of the score values for each of the plurality of sport players;
generating a recommendation list of the plurality of sport players as a function of a current draft status and the adjusted ranking values performing the above operations for at least one further sport player;

generating a recommendation list for the sport player and the at least one further sport player as a function of the corresponding adjusted ranking values;

determining an adjusted ranking value of a replacement player; and generating an updated recommendation list including the replacement player when the replacement player has a higher adjusted ranking value than for the sport players already included in the recommendation list.

23. The non-transitory computer readable storage medium of claim 22, wherein the operations further include:

re-determining the final ranking value further as a function of at least one of an average auction value, an average draft position, and a combination thereof.

* * * * *